(12) United States Patent
Staker et al.

(10) Patent No.: US 12,120,108 B2
(45) Date of Patent: *Oct. 15, 2024

(54) WEB INTEGRATION, TIMING, ACCESS, AND DISTRIBUTION CONTROL

(71) Applicant: Brain Chase Productions, LLC, Austin, TX (US)

(72) Inventors: Allan Robert Staker, Austin, TX (US); Heather Clayton Staker, Austin, TX (US); Danny Lee Lufkin, Austin, TX (US); Andrea Richeson, Austin, TX (US); Nicholas Aaron Weynand, Austin, TX (US)

(73) Assignee: Brain Chase Productions, LLC, Salt Lake City, UT (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/655,786

(22) Filed: Mar. 21, 2022

(65) Prior Publication Data

US 2022/0286444 A1 Sep. 8, 2022

Related U.S. Application Data

(60) Continuation of application No. 16/794,145, filed on Feb. 18, 2020, now Pat. No. 11,283,792, which is a (Continued)

(51) Int. Cl.
*H04L 9/40* (2022.01)
*G09B 5/00* (2006.01)
(Continued)

(52) U.S. Cl.
CPC ............ *H04L 63/083* (2013.01); *H04L 63/10* (2013.01); *H04L 63/101* (2013.01); *G09B 5/00* (2013.01);
(Continued)

(58) Field of Classification Search
CPC ......... H04L 9/40; H04L 63/083; H04L 63/10; H04L 63/105; H04L 63/107;
(Continued)

(56) References Cited

U.S. PATENT DOCUMENTS

| 2002/0029252 A1* | 3/2002 | Segan | G06Q 30/02 709/217 |
| 2004/0033475 A1* | 2/2004 | Mizuma | G06Q 10/06 434/219 |

(Continued)

FOREIGN PATENT DOCUMENTS

| AU | 2007357074 A1 * | 2/2010 | G09B 7/00 |
| CA | 2714523 A1 * | 3/2011 | G09B 5/06 |

*Primary Examiner* — Jayesh M Jhaveri
(74) *Attorney, Agent, or Firm* — KNOBBE MARTENS OLSON & BEAR LLP

(57) ABSTRACT

The present disclosure provides systems and techniques for improved back-end integration of third-party content and an administrative framework allowing for user experience management for a computer-based environment. Described herein, for example, are approaches to improving secure access to multiple web-based systems, integrating web-based content, and controlling timing of web interaction. The problems addressed herein relate to coordinating access and delivery of web content from and to multiple sources and multiple users in an integrated and time-controlled manner.

20 Claims, 13 Drawing Sheets

Related U.S. Application Data continuation of application No. 15/814,263, filed on Nov. 15, 2017, now abandoned, which is a division of application No. 14/624,336, filed on Feb. 17, 2015, now Pat. No. 9,825,940.

(60) Provisional application No. 61/940,088, filed on Feb. 14, 2014.

(51) Int. Cl.
  *G09B 5/02* (2006.01)
  *G09B 5/08* (2006.01)

(52) U.S. Cl.
  CPC .............. *G09B 5/02* (2013.01); *G09B 5/08* (2013.01); *H04L 63/105* (2013.01); *H04L 63/107* (2013.01); *H04L 63/108* (2013.01)

(58) Field of Classification Search
  CPC ........... H04L 63/108; G09B 5/00; G09B 5/02; G09B 5/08; G09B 7/00
  See application file for complete search history.

(56) References Cited

U.S. PATENT DOCUMENTS

| | | | | |
|---|---|---|---|---|
| 2006/0188860 A1* | 8/2006 | Morrison | ................. | G09B 7/00 |
| | | | | 434/362 |
| 2010/0027792 A1* | 2/2010 | Bangma | ............. | H04N 21/4627 |
| | | | | 380/239 |

* cited by examiner

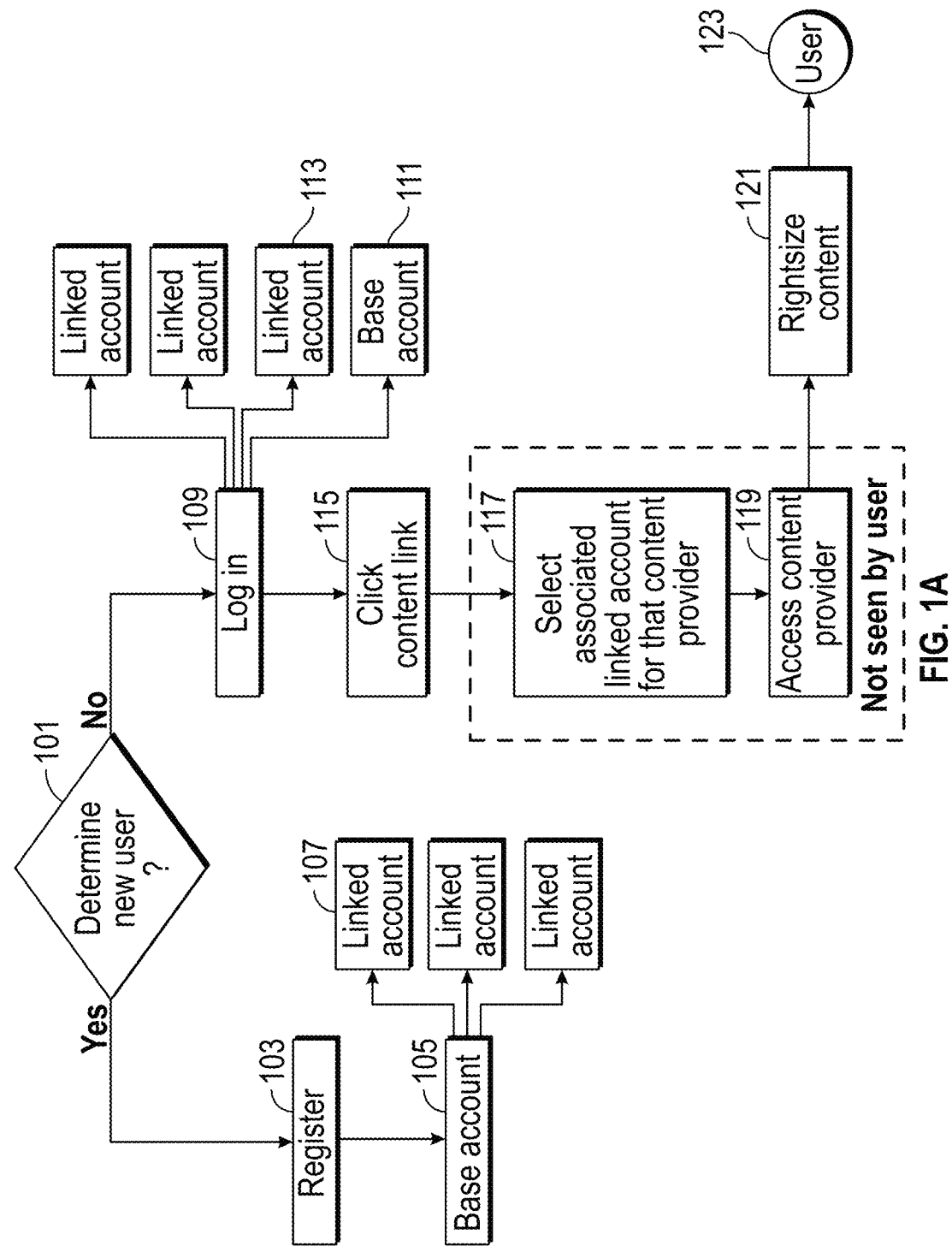

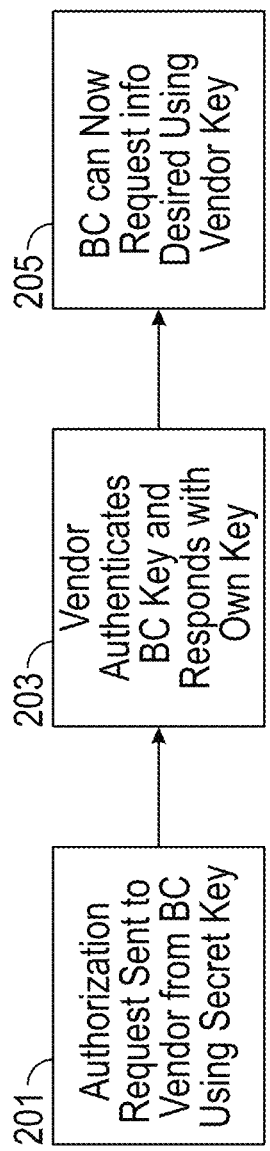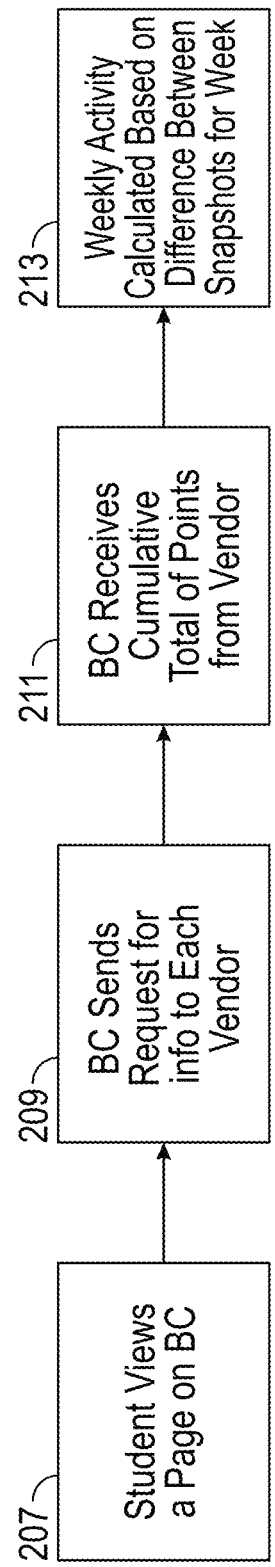

| A | B | C | D |
|---|---|---|---|
| ⑤ | Writing Curriculum | The Writing Assignment is Internally Delivered. The Student will Receive an Open-Ended Writing Prompt and will Begin Typing in a Text Field on the Page. Each Student will have a Minimum Word Count Requirement Based on his Age. Once He Exceeds the Word Limit, He can Submit his Work for Review from our Internal Teaching Staff. The Student will Receive Pass/Fail Feedback. | |
| ⑥ | Math Curriculum | The Student will Link to www.khanacademy.com and will Arrive Immediately at His Khan Account. As He does Different Math Problems and Watches Different Videos, He will Earn "Energy Points" on Khan Academy. Brain Chase will Track these Energy Points in Real Time Via the Khan Academy Open API. | |
| ⑦ | Bonus Challenge | Each Week the Student will have a "Bonus Challenge" Based on Either Online or Offline Content. for Instance, He will Receive a Compass in the Mail and be Required to do Some Orienteering Work, or He will be Directed to the Smithsonian Museum Virtual Tour to Find a Virtual Object. There will be Instructions and a Text Field with a Binary Answer, Either he is Right or Wrong. | |
| ⑧ | Return to Instruction Page | At Any Point During the Week or Assignments, the Student can Return to the Instruction Page and can See Where he Stands Relative to the Week's Assignments. for Example, He will see that he has Completed 36 of his 45 Reading Challenge, Earned 3500 of his 5000 Required Khan Points, or He has Completed his Writing Sample. | |
| ⑨ | Unlock Streaming Video | When all of the Requirements have been Met, Brain Chase will "Unlock" a Streaming Video on www.brainchase.com for the Student to View Online. This will not be Unlocked Until all of the Assignments/Challenges have been Successfully Completed. | |
| ⑩ | Continue | Once the Video has been Viewed, the Student will have to Repeat the Process on the Following Week. He may be Presented with a Clock Countdown that Indicated when the Following Assignments will be Given. The Process Continues Until all Six Weeks have been Completed and the Students have Viewed all of the Animated Content. | |

FIG. 6
(Continued)

WEB INTEGRATION, TIMING, ACCESS, AND DISTRIBUTION CONTROL

PRIORITY AND INCORPORATION

This application is a continuation of U.S. patent application Ser. No. 16/794,145, filed Feb. 18, 2020, which is a continuation of U.S. patent application Ser. No. 15/814,263, filed Nov. 15, 2017, which is a divisional of U.S. patent application Ser. No. 14/624,336, filed Feb. 17, 2015, and titled "WEB INTEGRATION, TIMING, ACCESS, AND DISTRIBUTION CONTROL," which claims the benefit under 35 U.S.C. § 119(e) of U.S. Provisional Patent Application No. 61/940,088, filed Feb. 14, 2014. Any and all applications for which a foreign or domestic priority claim is identified in the Application Data Sheet as filed with the present application are hereby incorporated by reference under 37 CFR 1.57. The entire disclosure of each of the above items is hereby made part of this specification as if set forth fully herein and incorporated by reference for all purposes, for all that it contains.

TECHNICAL FIELD

Embodiments of present disclosure relate to systems and techniques for back-end protocols for integrating web-based content, and controlling timing and access thereto and distribution thereof.

BACKGROUND

It can be difficult to coordinate access and delivery of web content from and to multiple sources and multiple users in an integrated and time-controlled manner. In particular, security concerns may compete with ease of access; APIs may not be compatible; different timing and allocation requirements may be in tension or be initially non-aligned. Accordingly, the present disclosure addresses these and other concerns in a computer environment.

SUMMARY

The systems, methods, and devices described herein each have several aspects, no single one of which is solely responsible for its desirable attributes.

Described herein, for example, are approaches to improving secure access to multiple web-based systems, integrating web-based content, and controlling timing of web interaction. The problems addressed herein relate to coordinating access and delivery of web content from and to multiple sources and multiple users in an integrated and time-controlled manner. The approaches described help resolve security concerns while still providing ease of access. Solutions include coordinating with multiple APIs, and assessing and coordinating different timing and allocation requirements.

A method is described that can automatically access and store current security, access, and graphic interface requirements for a first external web-based system using a first API specific to that first external web-based system. The method can further include automatically accessing and storing current security, access, and graphic interface requirements for a second external web-based system using a second API specific to that second external web-based system. The method can further include providing a base portal configured to access the first and second external web-based systems and integrate content from each of the two systems. The method can further include establishing a user account for accessing the base portal. The method can further include using the current security and access requirements from each of the first and second external web-based systems to establish a minimum level security protocol that complies with the current security and access requirements for each of the first and second external web-based systems, the user account requiring at least a unique base portal user identifier and base portal access password. The method can further include providing for creation of a base account through the base portal. The method can further include using creation of the base account and the first and second APIs to trigger automatic creation of a first linked user account and a second linked user account, one for each of the first and second external web-based systems, each of which linked user accounts is uniquely linked to the base account and cannot be used when the first and second web-based systems are accessed directly. The method can further include requiring periodic access and use of content from each of the first and second external web-based systems, such as periodic access comprising at least once a week. A minimum number of periodic access times can also be established—for example, once a day or once a week for an entire summer, an entire semester, an entire month, a certain number of weeks, etc. The method can further include establishing at least two separate interactive visual controls within the base portal, the controls linked specifically with the first and second external web-based systems, each control operable to periodically establish secure access to each of the external web-based systems within the base portal, the base system responsive to selection of each control by rapidly rendering content from the external web-based systems in a combined base interface. The method can further include establishing timing constraints by accessing each of the first and second linked user accounts or the base account at least once per week and recording a current snapshot of data associated with each linked account. The data can include one or more of the following: a cumulative point total associated with the user; a value associated with how long the user has performed a certain assignment; a value associated with how many words the user has typed; and/or time of the user's last action in the linked account. The method can further include using the timing constraints to restrict access to the linked user accounts from the base portal or access to and functionality of the base portal.

Furthermore, described herein is a system. The system can comprise an electronic database comprising a plurality of user entries, each user entry comprising logon and usemetric information. The system can further comprise a hardware processor, the hardware processor configured to execute software instructions. The software instructions can be configured to cause the hardware processor to do one or more of the following: receive registration information from a user computer regarding a first user; access, over a network, a partner API to register the first user with a partner website or to link the first user with a user account associated with the partner website; receive the user account, the user account associated with the first user; store in the electronic database a first user entry of the plurality of user entries, the first user entry comprising the registration information and the user account; direct the first user, over the network, to assignments to be completed by the first user on the partner website; receive, over the network, first user metrics associated with completed assignments by the first user; store in the electronic database, as a part of the first user entry, the first user metrics; determine, based on the first user metrics, whether the first user has sufficiently completed assignments for a first clue, wherein the first clue comprises a series of animations; in response to determining that the first user has sufficiently completed assignments for a first clue, transmit clue display data, to a user device associated with the first user, configured to display the first clue; determine, based on the first user metrics, whether the first user has sufficiently completed assignments for a final clue; and in response to determining that the first user has sufficiently completed assignments for a final clue, transmit final clue display data, to the user device associated with the first user, configured to display the final clue. In some example implementations, a user can be a student, and the clue can relate to a treasure hunt, such that the final clue may contain information leading to a treasure buried within the earth. Not all contests, incentives, or rewards may involve clues. Incentives (e.g., rewards, prizes, payments, etc.) can be provided directly, rather than through an additional mental puzzle or challenge. In examples that call for clues, they can be provided in various ways to users that have earned access to them. Clues may be provided in audio, visual, numerical, literary, and/or other ways. Clues may be provided through a still image or a video, whether recorded from live actors or animation.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 1A illustrates the system of processes involved in improved content integration.

FIG. 2A illustrates a series of processes involved in communicating and authenticating with a content provider.

FIG. 2B illustrates a series of processes involved in obtaining data snapshots of user info associated with a user's linked account.

DETAILED DESCRIPTION

Figure 1B:
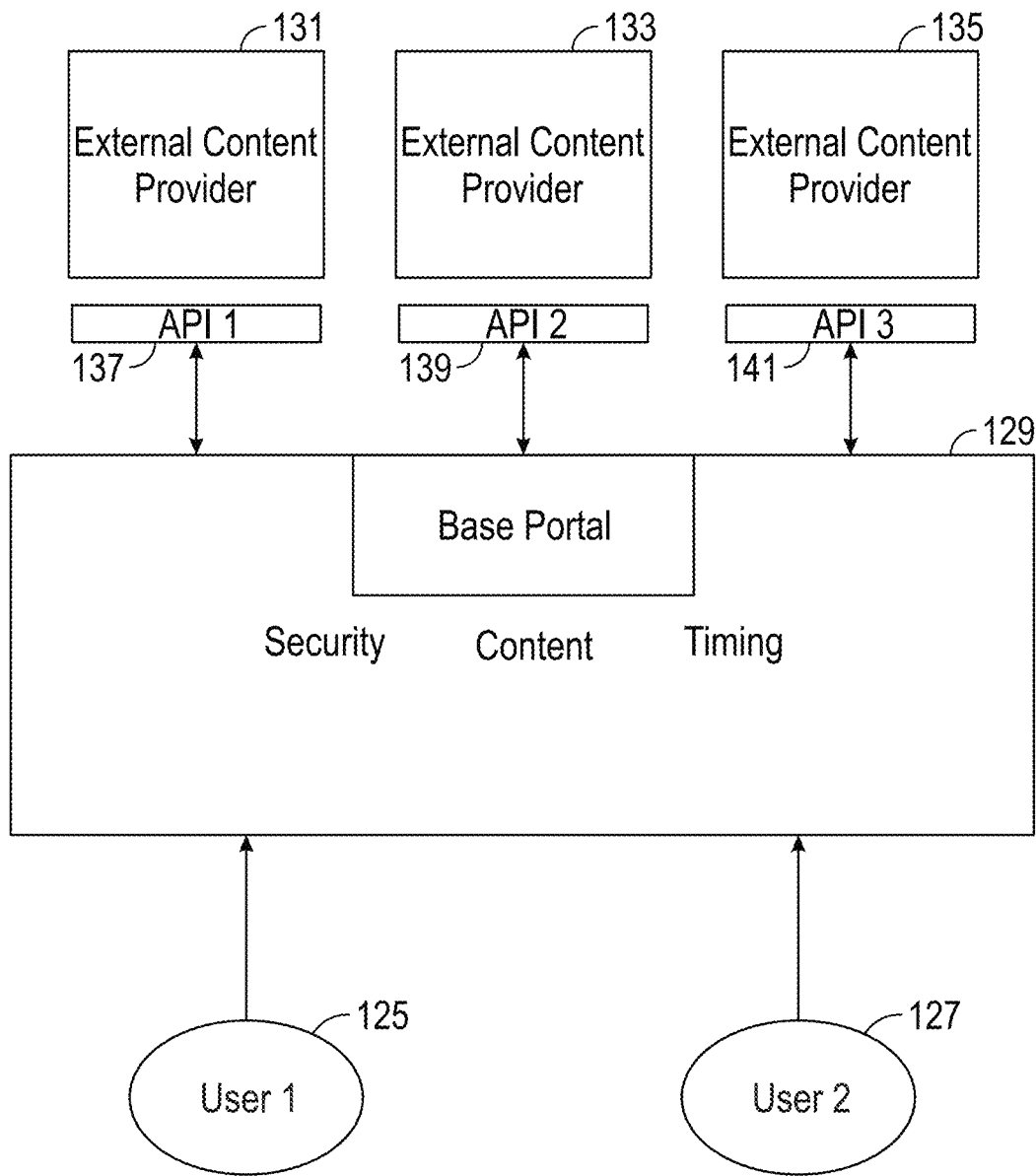
FIG. 1B illustrates an overview of improved content integration.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As described above, embodiments of the present disclosure relate to computerized systems and methods designed to provide improved integration of content and easy administration of the user experience.

A web portal related to the above software and hardware may: provide for a web interface for operators to manage their accounts; allow for storage of some or all uploaded data into a secured database; provide for authentication of all access to the web portal; allow users to remotely access their account and billing information via a special or a regular web browser. All traffic may be encrypted.

The computerized systems and methods described in this disclosure are platform agnostic and may be configured to run on any hardware computing platform, such as Mac, PC, and mobile computing devices, or may be configured to run on any software computing platforms, such as through applications or websites.

Account Creation and Linking

Referring now to FIG. 1A, an embodiment is shown of the system of processes involved in improved content integration. The Determine New User 101 process first determines whether the user is new, or has a pre-existing base account. One method for doing this is presenting the user with input fields to enter relevant account information such as username/user ID and password, while also presenting a separate link or button allowing new users to enroll or register. If the user is a new user without a pre-existing base account, then the user can be directed to the Register 103 process. The Register 103 process collects information from the user needed to create Base Account 105. This can include relevant user information such as birthdate or age, grade, username or user ID, password, email, information associated with a parent of the user, etc. The Register 103 process may be configured to not allow the creation of Base Account 105 unless the user has inputted a unique username or user ID. Since Base Account 105 can be linked to accounts at third-party content providers, it may be helpful for a user to have an individual account that no other user shares. After Base Account 105 is created, the information can be used to then create various Linked Account 107 accounts at different content providers. This may be done by passing relevant user information to a content provider to create the linked accounts for the user. Linked account information or ID may be passed to the content provider in order to actually link the Linked Account 107, to the base account, Base Account 105. The linking may consist of storing the base account and linked account information in a data structure on any means of data storage. For example, the base account username and password, along with all linked account usernames and passwords, for a user may be stored in an array or a database, such as MySQL, which is then stored on a hard drive, portable electronic media, cloud storage, etc.

Log-In Processes

The user may then be sent to Log In 109 process, which is also arrived at if the user has entered a valid base account username and password at the Determine New User 101 stage. In that case, the base account credentials can be verified by comparing the user's inputted credentials against the base account credentials in the data structure that stores all the base account information alongside their associated linked account information. If the log in has been successful, then at the Log In 109 process, the user will be simultaneously logged into Base Account 111 and any associated Linked Account 113 using the credentials and information stored in the data structure. This way, the user can gain access to any linked accounts by only logging in once, which can be very helpful for improved content integration. If the user had just registered, then Base Account 111 may be the same account as Base Account 105, and Linked Account 113 may be the same linked account as Linked Account 107. Linked Account 113 may pass to the user an authentication token that will let the content providers know that the user has successfully logged into the linked account when the user seeks to view that content later on. In some cases, the authentication token may be a cookie. Alternatively or additionally, the system may look up the linked account credentials and pass them off to the content provider only after the user has requested to view content. The actual logging into the content provider may not actually occur until the Select Associated Linked Account 117 process or the Access Content Provider 119 process.

Generally, after the user has been logged into the accounts, the user may be brought to a dashboard, instruction page, or home page that may be provided by a base account (through which access to content providers is controlled and adapted, using security protocols, timing constraints, and visual integration.) An example of a content provider is an educational website. The user may attempt to do an interactive procedure (e.g., in an educational game context, a challenge or assignment), invoking the Click Content Link 115 process. The Click Content Link 115 process can direct a user to the content held by the associated content provider. However, it may be possible for a base portal originator to provide content rather than a third party content provider, in which case the Click Content Link 115 process can direct the user to the content that is hosted internally by the base portal originator. In such a situation, the Select Associated Linked Account 117 and Access Content Provider 119 processes can be skipped because a linked account may not be not necessary, as the content can be accessed already by the user via the base account. An example of a base portal originator is an academic challenge provider—an entity or system that provides challenges and rewards to motivate and incentivize regular, secure, time-controlled access to and input to web interfaces (e.g., those providing education content, both from the base portal and from third party content providers).

The Select Associated Linked Account 117 process may then determine, based on the content link, which linked account to access or the appropriate linked account credentials. An example of a third-party content provider in the education context is Khan Academy, accessible through the web at <https://www.khanacademy.org/>. For example, the user may have clicked a link to do a math assignment, and can be brought to their Khan Academy linked account to do the math problems provided to that account. To gain access to this account however, Access Content Provider 119 process may need to be invoked. The linked account credentials, and any other relevant user or account information, may need to be passed off to the content provider. For example, the user's age or birthdate may be sent to the content provider to later play a role in rightsizing content. All of this may be done through an API, or any kind of authentication protocol. Moreover, the content provider may allow the user access to the linked account if the user already possesses an authentication token.

Khan Academy is a merely non-limiting example of a third-party content provider. Some further non-limiting examples of third-party providers of content, curriculum, and learning/activity options may be Rosetta Stone, Google Books, and any providers of physical or exercise challenges.

Content Adjustment and Customization

After gaining access to the content on the linked account, the content provider may choose to use a Rightsize Content 121 process. It is desirable for the content provider to provide age or grade appropriate content for the user. For example, it will be better for a sixth grader to solve six grade math problems rather than first grade math problems. Thus, if the age or grade of the user has been passed off to the content provider during the Access Content Provider 119 process, the content provider can make sure to send the appropriate content via Rightsize Content 121 process. However, this Rightsize Content 121 process may not be necessary if the linked account to the content provider was created with age, birthdate, or grade information at the time of registration. In that case, the linked account can be tied to an age or grade and this information may not need to be passed to the content provider when the user accesses content. However, passing this information to the content provider may be useful when the content provider does not keep track of age or grade information, or keep that information up-to-date. After the Rightsize Content 121 process, the content is delivered to user 123.

The framework may be capable of rightsizing content for the user. The content provided to the particular user by a content provider may be content appropriate to that user. In an education context, appropriateness for a user can be defined by a user's (e.g., a student's) age or grade level. For example, a sixth grader may not be automatically presented with reading assignments of a first grade level. In order to do this, the age or grade level of the user may be passed to the content provider, such as via the API, when the linked account is created or when the user is attempting to access the linked account or content associated with the content provider. Thus, the provider may recognize age and/or grade level of each student as accounts are created for each student (during one-step registration above), as the student is logging into the linked account (during single sign-on), or when the student clicks a link to view an assignment or challenge from that provider. If content turns out to be too easy or too difficult for the student (as identified either by attrition, student/parent feedback, automatically as students continue to miss math problems, some combination of these, or by some other method entirely), the framework may present option(s) for adjusting difficulty level for that particular student. These options potentially include, but are not limited to: automated content recalibration, user manual reset via presented settings, and admin reset options.

Content Integration

Referring now to FIG. 1B, an outline is shown of how improved content integration works. There can be multiple users, such as user 125 and user 127. Both user 125 and user 127 need not have direct access to any external content providers. Their direct access is to the Base Portal 129. Base Portal 129 interfaces with user 125 and user 127 and has an administrative framework like the one discussed herein, which handles security, content, and timing for the users. Base Portal 129 is capable of passing information back and forth to External Content Providers 131, 133, and 135. Base Portal 129 may pass this information via a custom API tailored for the external content provider, such as the use of API 137, 139, and 141 in order to interface with External Content Providers 131, 133, and 135. Thus, the educational content provided to Base Portal 129 is provided to the users, who never have to interface directly with any external content providers. (Such an advantage can be referred to in some cases as "seamless," and is an example of the improved content integration discussed herein.) The users need only register and log-in once, to Base Portal 129, to get access to content provided from a multitude of sources.

The framework may be able to further adjust for the difficulty of the education content provided by various content providers. In some embodiments, adjusting for difficulty may be done simply using the "common denominator" solution, where all users need to attain a certain number of "minutes read", a "word count", or "energy points." In such a system, managing difficulty across users is not a tremendous issue because rightsizing educational content can be done by the content provider as previously described. Different users can be essentially doing the same amount of work, but the difficulty of that work can vary based on the user's age or grade. However in some embodiments, the framework may also allow for the internal scaling of difficulty. This may become an issue if a system provider (e.g., an academic challenge provider or base portal) wishes to weight different subjects (and therefore content from different providers—e.g., third party content providers) at different difficulty levels, or if a specific content provider assigns content difficulty in an idiosyncratic manner. For example, the content provider may present for only the older students a very, very difficult problem at the end of the assignment. The academic challenge provider or base portal may wish to correct for that through the use of the framework, which may allow for an internal metric, such as internal points. Varying amounts of internal points can be assigned to the completion of problems for the different kinds of problem formats associated with the different content providers. Thus, the difficulty structure for a content provider can be mapped out and correlated to an internal point system.

The embodiments described herein provide distinct improvements to computer technology, namely the back-end integration of content from third-party content providers in order to enhance user experience. For example, using the system of processes contemplated and disclosed in FIG. 1, the system allows for an user account to relatively smoothly and simply (e.g., "seamlessly") access the educational content from different providers without having to log into multiple accounts. An administrative framework is also provided for the administrators of the academic challenge to manage and enhance the user experience in the academic challenge. This framework allows for a variety of features, including parental control of student accounts, tracking the weekly progress of students within the academic challenge, the grading of writing assignment submissions, and other features integral to an academic challenge or contest.

In some embodiments, the administrative framework may comprise any content-management system or framework. For example, the administrative framework may comprise Drupal, WordPress, Apache Sling, etc. In some embodiments, the administrative framework may comprise Drupal and utilize traditional features in the Drupal framework. In some embodiments however, the administrative framework may be an improved or modified version of a traditional content-management framework. In some embodiments, the administrative framework may comprise an entirely custom content-management system or framework.

The choice of content-management framework may be important because it may dictate the additional features available that are not present in a traditional content-management framework. For example, a traditional Drupal method is to have user accounts controlled by an individual, with non-administrators having no control over other user accounts. In such a setup, a unique email address is required for each user. However, in some embodiments it may be necessary for the administrative framework to allow for parental control of student accounts.

In order to allow for improved (e.g., seamless) content integration, the framework preferably can provide access to content on a third-party provider's website that would traditionally be accessed with an account specifically registered with the third party. Providing a user with a base account that grants access to a unique linked account at the third party content provider allows for the user to receive individualized content and track their own individual progress. This becomes a more difficult issue when there are multiple content providers, as the user's access needs to be established with all of them and tracked. In some embodiments, the framework will provide for one-step registration so that the user can register a base account associated with the academic challenge and be simultaneously enrolled in linked accounts with third-party content providers. The user need not be exposed at all to the registering of the linked accounts.

Example Context and Use Scenario

Summer vacations do not usually provide any intellectual or academic challenge for school students. This can be remedied by online education systems, which are a way that students can learn outside the traditional school setting. In many instances, online education is set up in a similar manner as the traditional school setting. For example, a student may view pre-recorded lectures on various topics while completing daily or weekly assignments on specific topics.

These online education systems may further leverage gameplay to enhance learning. Games actively engage young students and make them more motivated in their learning. These games can be integrated into the learning component in a variety of ways. For example, the lectures can be instructional games, or the assignments can be games that students need to complete in order to progress. Alternatively or additionally, the online education system itself can be a game that the student is looking to complete by accomplishing goals or accumulating points.

These online education systems built around gameplay require a way of integrating the assignments and curricula, which often may be provided by third-party educational content providers. Improved (e.g., seamless) integration of educational content prevents young students from having to deal with administrative tasks like logging-in to access the educational content. This allows the students to focus on the assignments and stay fully-immersed in the gameplay. Furthermore, a way of providing easy administration of the user experience for those running the online education system also allows students to focus on assignments and gameplay by reducing the amount of detracting user experiences. Thus, the present disclosure provides for improved integration of educational content and an administrative framework for managing and enhancing the user experience in an online education system, specifically allowing for students to be continually motivated and engaged in a fun and academic computer-based treasure hunt for a configurable period of time.

Accordingly, one non-limiting example of an application for the technical solutions described herein is student learning environment. In one such embodiment that improves upon the traditional Drupal method discussed above with respect to FIG. 1, the student user accounts are controlled by the student's parents via a "Student" data structure that contains all student info. Parents are owners of the "Student" data structure, which means only the Parent and administrators can access a student's data. Students cannot change their own info. Any changes made to the "Student" data structure are automatically made to student's standard Drupal user account (which controls the student login process). Furthermore, a student unique email address is generated by using the Parent User ID. When a student requests new password, the password is sent to the parent instead of using the unique email address. In some embodiments, parent and student accounts are automatically created at time of payment via a tie-in to the Stripe payment processing API. However, the actual method of payment need not involve a Stripe API, and can be any method or API that allows for web and mobile payments, such as WePay, PayPal, Balanced, BankBox, etc. In some embodiments, the administrative framework further allows anyone with administrative privilege to change any user info associated with the user's account. So the administrative framework may be used to add or subtract points from a user's account, or it may also be used to easily move users to different points or stages within the academic challenge or GUI, in the event that the user has become stuck somewhere.

In some embodiments, this same method that allows the student's parents or an administrator account to control the student's data can be used in any other situation where a parent-child relationship exists. For example, a similar administrative framework, which improves upon the traditional Drupal method, can be used by a bank in order to control and edit data associated with an account of one of the bank's branches. The framework may also be used by a bank or its branches to control and edit data associated with a customer account, and the customer may be unable to change their own info by themselves. Whether this framework is be optimal for a situation involving a parent-child relationship may be determined on a case-by-case basis, for example.

Referring now to FIG. 2A and FIG. 2B, an embodiment is shown of the series of processes involved in communicating and authenticating with a content provider, as well as an embodiment of the series of processes involved in obtaining data snapshots of user information associated with a user's linked account. These processes may be helpful in tracking the user's progress within the academic challenge and keeping the instruction page up-to-date.

Access to Content

It can be useful to automatically provide the user access to all of the content of these third-party providers beforehand, because it can avoid need for a user to pause to gain access in the middle of the academic challenge. Furthermore, integrating with a multitude of third-party content providers allows the academic challenge to pick the content from the best-in-class content provider for a given academic subject. For example, the assignments in the academic challenge can comprise math problems from a math vendor and reading challenges from a reading vendor. In this example, integrating access to the content from both vendors also allows a user to go through the academic challenge without interruption, and the user may smoothly (e.g., seamlessly) switch from doing math problems to reading challenges. In some embodiments, the framework provides for single sign-on, such that a user can log into their base account associated with the academic challenge and be simultaneously logged into the user's linked accounts with third party content providers. The user need not be aware of the logging-in to the linked accounts.

Efficient Access

In some embodiments, both the one-step registration and single sign-on processes may be provided for through the content provider's custom API or another protocol. In some embodiments, the one-step registration is handled by creating linked accounts through an API post or some other protocol. This allows for different third-party providers to have different field requirements and these custom fields can be built into the registration process.

In some embodiments, if a user does not have an account already, the framework may obtain information from the user and enroll the user in a base account that allows the user access to the system. One-step registration may be done by passing over student data over to the third party content provider through the use of a custom API. No password is needed to be passed over in some embodiments, since the student may be authenticated through single sign-on. However, the relevant information obtained from the user can be used to generate a unique ID that can be used to match a user's base account to the linked accounts of various content providers or vendors. These linked accounts may be linked to the base account in order to provide for single sign-on, so that the user only needs to access their base account in order to simultaneously obtain access to the linked accounts and the content provided at the various content providers or vendors.

Linked Accounts, Security in Educational Context

An example of a third part content provider is MyON.com. This example provides an example case for describing some of the solutions provided herein. For example, linked accounts may be established at the educational content provider, MyON.com. In this process, the student may registered for a base account by providing a User ID (may be required to be unique) and password, which may require certain characteristics, such as being more than 2 characters. The framework may be able to provide an error code to tell a user or parent if a user id is not unique. It may be required that the user ID is a unique ID before data is sent to a content provider, which in this case is MyOn. For non-unique ids, a unique number may be appended to the user ID to make it unique. The framework may also distribute a key that a parent enters in order to access registration screen, or require a key field that parents much fill out for access. The registration form itself may comprise a few fields such as username and password, an email field for the user's email address, or a text verification field. The email fields and the text verification fields may be used to verify the user. For example, the text verification field may require a CAPTCHA text entry, or a key or value that was emailed to the user after the user's email address is collected. When this information is collected (and optionally verified via email or another method), the framework may then send over this data to the content provider's system, or automatically and directly create the account in their system through the use of an API. If only user data is being sent to the content provider, then the content provider may establish an account for the student using that data provided. The registration screen may be on a separate portal site, with a link over to the separate portal from a base portal (e.g., a main academic challenge website). An embedded URL may be provided to students or their computers. This embedded URL, when passed to a partner, may identify these students as belonging to the base portal (e.g., an academic challenge website such as BrainChase.com).

Further to the discussion above regarding linking, if the user already has an account, then the user can log-in to access their base account, which may also provide simultaneous access to any of the linked accounts that are linked to the base account. Once the user logs into their base account, they may gain access to all the linked accounts of the various content provides or vendors and, thus, all the content, assignments, and curricula involved in the academic challenge, for example. In some embodiments, accessing the base account may provide direct access to the linked accounts or allow the user to access or view content from the content providers or vendors. In some embodiments, the linked accounts will be associated with providers or vendors of educational content, such as <www.myon.com> and <www.khanacademy.com>. This can be used by the provider of the base portal (e.g., an academic challenge provider) to smoothly integrate the content from various content providers or vendors. When the user is playing through the academic challenge, the user will not need to proceed through another log-in or enrollment process. The user will not need to log into a content provider's site in order to access assignments or curriculum, and may simply be directed to the assignments on the content provider's site. In some embodiments, the base portal provider (e.g., an academic challenge provider) may not actually be directing the user to a third party content provider's site. Instead, the user may remain on the base portal (e.g., academic challenge) website and simply be provided educational content that has been extracted from the content provider. This extraction may occur through the use of the content provider's API to communicate the content between the base portal (e.g., academic challenge website) and the content provider's website.

An example of a base portal provider that can also be an academic challenge provider is Brain Chase, available through <www.brainchase.com>. Thus, in some embodiments of this single sign-on methodology, students may be able to log in to their Brain Chase account on <www.brainchase.com>, then link directly from this base account into a linked content provider's website account without logging in a second time. This may be accomplished through the use of an authentication protocol, such as but not limited to, SAML 2, OATH, or the LTI protocol. The student's ID may be passed to the content provider, and the content provider's system authenticates the student. This communication may occur through the use of an API.

Time Control and Snapshots

A third-party content provider typically keeps records of a trackable metric for the users. Such metrics may include time spent reading for a reading assignment, a word count for writing assignments, or a given amount of points awarded on a pre-defined basis. Further metrics include pages read, problems completed, books opened/completed/ abandoned, etc. Many third-party content providers allow for the sending of user data, such as the previously-mentioned examples of trackable metrics or a student's cumulative point total, via a custom API to the base portal provider (e.g., an academic challenge provider). Obtaining this user data and keeping it up-to-date can be very helpful for motivating students and maintaining proper function of the administrative framework, which may possess features that require up-to-date user data held at by these third-party content providers. In some embodiments, the base portal provider (e.g., academic challenge provider) may track and refresh this user data from third-party content providers on a real-time, or close to real-time, basis. However, this method may not be completely efficient because the values in this user-data are not likely to change without additional user input. For example, an increase in the cumulative point total will typically occur upon the successful completion of a problem or assignment. Thus, it may be more efficient to take a data snapshot of the user data held at third-party content providers only upon the occurrence of an event that may actually cause the user data to change. In some embodiments, the administrative framework takes a data snapshot of the user data and checks the amount of points the user has anytime the user performs an action.

However, looking at only a singular data snapshot of the user data may create problems if it is necessary to keep track of changes in the data snapshots or the user data. For example, it may be necessary to know how a data snapshot has changed over the course of a week in order to understand how much progress the user has made in that week. Remedying this problem may involve taking a series of data snapshots in order to monitor change in the data in the time window. Thus, a base portal provider (e.g., an academic challenge provider) may need to know the starting point total for two consecutive weeks (or time periods) and then be able to know the absolute value of the difference between the two values. The base portal provider may need to be able to capture user data in a different way than the third-party content provider captures their user data.

Thus, in some embodiments, the administrative framework allows for the taking of data snapshots of user information held at third-party content providers or vendors in order to determine the progress or achievement the user has made in the academic challenge within just the week. For example, points tracked and displayed by the academic challenge provider may be "zeroed out" at the beginning of each week because a student needs to accumulate 10,000 points per week in order to progress in the academic challenge. In some embodiments, every time user data is received via the API it is stored in a "Points" data structure with a timestamp, the cumulative data, and the delta between the cumulative data from the current synchronization and the cumulative data from the previous synchronization. The deltas are totaled for the current student week to determine student activity for the week. In some embodiments, if at any time an error in synchronization occurs, or an administrator wishes to expedite progress, the administrator can simply insert a new "Points" data structure, enter the delta and assign it to the student. The student would then be given credit for those points for the week.

In order to take these data snapshots of user information and obtain the information in the first place from third-party content providers, the framework may preferably communicate and authenticate with the third-party content providers. The exact authentication and information request processes may be different or unique based on the third-party content provider, and it is typically provided for through the content provider's custom API and an authentication handshake. In some embodiments, in order for the framework to be able handle multiple third-party content providers, the framework allows for swappable or switchable APIs based on the specific third-party content provider that information is being requested from. The framework may be able to determine the specific third-party content provider that information is being requested from, and then select the corresponding API for communicating and authenticating with that content provider.

Authentication Examples

The framework may authenticate with the content provider Khan Academy. User Authentication can use the standard OAuth 1.0 protocol, for example. When a student accesses any page in the Brain Chase app, a request is sent to Khan Academy using the Khan Academy Secret Key established through the Brain Chase Khan Academy account. Khan Academy verifies the info and sends back their own Authentication keys. Brain Chase bundles the Khan Academy authentication keys into a request for the latest information on the logged in student using the username provided by the student. A snapshot of the student's data is taken. If the points total for the week exceeds the student's goal for the week then the student is given credit for completing that week's Math Challenge. If completing the Math Challenge completes all Learning Challenges for the week, then the student is advanced to the next week.

In some embodiments, the framework may authenticate with the content provider MyON via the Brain Chase site. User Authentication can use the standard OAuth 1.0 protocol. When a student is logged into MyON through the Brain Chase site, data is sent back to brainchase.com to a specific url that "listens" for activity after every page action on the MyON site. Based on the authentication protocols sent to Brain Chase by MyON, Brain Chase verifies receipt of the protocols and then sends its own keys back to MyON. MyON can then send the number of minutes read for the last action. A Snapshot is created for the number of minutes received. If the minutes total for the week exceeds the student's goal for the week then the student is given credit for completing that week's Reading Challenge. If completing the Reading Challenge completes all Learning Challenges for the week then the student may be advanced to the next week.

In some embodiments, the framework with authenticate with the content provider myON via an iPhone or Android application. User Authentication uses the standard OAuth 1.0 protocol. When a student establishes a Wi-Fi connection to MyON through the app the total minutes read since the last connection are sent to MyON. Whenever a page is viewed on the Brain Chase site, a request is sent to MyON for using the authentication keys/secret established with the MyON Brain Chase account. MyON responds with its own keys/response data authenticating the request. Brain Chase bundles the MyON response data with a request for info on the specific logged in user. MyON then sends the total minutes read for that user to Brain Chase. A snapshot is created for the total number of minutes read. If the minutes total for the week exceeds the student's goal for the week then the student is given credit for completing that week's Reading Challenge. If completing the Reading Challenge completes all Learning Challenges for the week then the student is advanced to the next week.

Turning to FIG. 2A, the Authorization Request 201 process is used once the user accesses educational content provided from any content provider or vendor. The base portal provider (e.g., an academic challenge provider such as Brain Chase), sends an authorization request to the vendor using a secret key. This is performed using the Application Programmer Interface (API) provided by the content provider or vendor. Vendor Authentication 203 process is performed by the vendor when they receive the authorization request sent by Authorization Request 201. The vendor verifies and authenticates the secret key, and then responds to the academic challenge provider, or Brain Chase, with the vendor's authentication key. After obtaining this key, Brain Chase may request desired user information by providing the vendor's authentication key to the vendor in the Information Request 205 process. In some embodiments, the user info request will comprise an amount of points associated with how much of an assignment or curriculum that the user has completed. For example, Brain Chase may use Information Request 205 process to request from Khan Academy how many "energy points" the specific user has in the user's linked account. This series of processes allows for communication of user information between the base portal provider (e.g., an academic challenge provider) and other content providers, which can enable the academic challenge provider to take data snapshots of the user info in order to calculate the user's weekly activity and accomplishments, as shown in FIG. 2B.

In FIG. 2B, the Student Views A Page 207 process is involved when the user accesses an educational content link or page associated with the academic challenge. This may also involve some, or all, of the Link to External Challenges 105 process depicted in FIG. 1. For example, the 207 process may involve the user clicking on a link to do "Week 1's Math Assignment" and be directed to a math curriculum provided by Khan Academy, with access to the curriculum already enabled through single sign-on. Immediately once the user obtains access to this educational content, the base portal provider (e.g., an academic challenge provider such as Brain Chase), may send out a request for user information to every content provider or vendor using the Request for Info 209 process. This request for information may involve some, or all, of the 205 process in FIG. 2A which may further mean that Brain Chase sends a request for desired user info to all content providers or vendors using each vendor's authentication key. For example, Brain Chase may request the total number of "energy points" the user has accrued from Khan Academy using Khan Academy's authentication key, while simultaneously requesting the total "active time" the user has spent reading from MyON using MyON's authentication key. This request for information is sent out to each vendor, so that accessing any educational content link will bring the user's info up-to-date for all content providers and vendors. However, in some embodiments, this request for information may be sent to a single vendor that is associated with the content that the user has accessed in the Student Views a Page 207 process. Afterwards, the base portal provider (e.g., an academic challenge provider such as Brain Chase), may receive a cumulative total of "energy points", "active time", or any other relevant user info or metrics from the vendor in the Receive Cumulative Total 211 process. Note that Brain Chase receives a cumulative total because content providers or vendors traditionally only keep track of the total number of points, time, etc. earned by a user rather than track changes in points or time over a defined timeframe. However, the base portal provider (e.g., an academic challenge provider such as Brain Chase) may be more concerned with the change in points or time over a given week, because the academic challenge may be a treasure hunt that takes place over the course of six weeks and may require users to complete assignments issued weekly. In order to track this, the weekly activity for the user may be calculated based on the difference between data snapshots from week-to-week using the Weekly Activity Calculated 213 process. This may be done using a variety of methods. In some embodiments, the difference between data snapshots is calculated by storing weekly cumulative totals, or at the very least the previous week's weekly cumulative totals (taken at the end of the week, i.e. a Saturday or Sunday), in a database or data storage of some sort. The previous week's cumulative total is compared to, or subtracted from, the user's current cumulative total in order to obtain the user's achievement or activity for the week.

Timing Control and Constraints

In some embodiments, the administrative framework is designed to prevent students from completing all contest challenges in advance. This can be useful when one of the goals of the contest is to keep students active and intellectually engaged for an extended period of time (e.g. 5-6 weeks). As students complete a challenge, their status for the challenge is stored in a "Status" data structure that includes the semester, week, and challenge type. Challenges in this case are loosely defined as tasks that a student must complete, such as watching the weekly intro video, or completing a reading/math assignment, or completing a bonus challenge. Learning challenges are not available for solving until the introductory video is watched. The clue video, crucial to solving the puzzle, isn't revealed until all learning challenges have been completed for that week. Students cannot complete a challenge beyond the current week of the Semester, so if a student begins the contest on the official contest start date that student is limited to completing one week of challenges and then must wait until the next week begins. Late-starting students, however, can complete as many weekly challenges as needed to catch up to the official contest week. For example, if the contest is on Week 4, and someone just starts the contest, the student can complete all challenges for Weeks 1-4 before running into the restrictions. In order to accomplish this, the framework keeps track of the enrollment date of the student and can compare it to the start date of the contest to make a determination on whether the student started late (and should be allowed to catch-up), or is not being diligent in completing the coursework.

Figure 3:
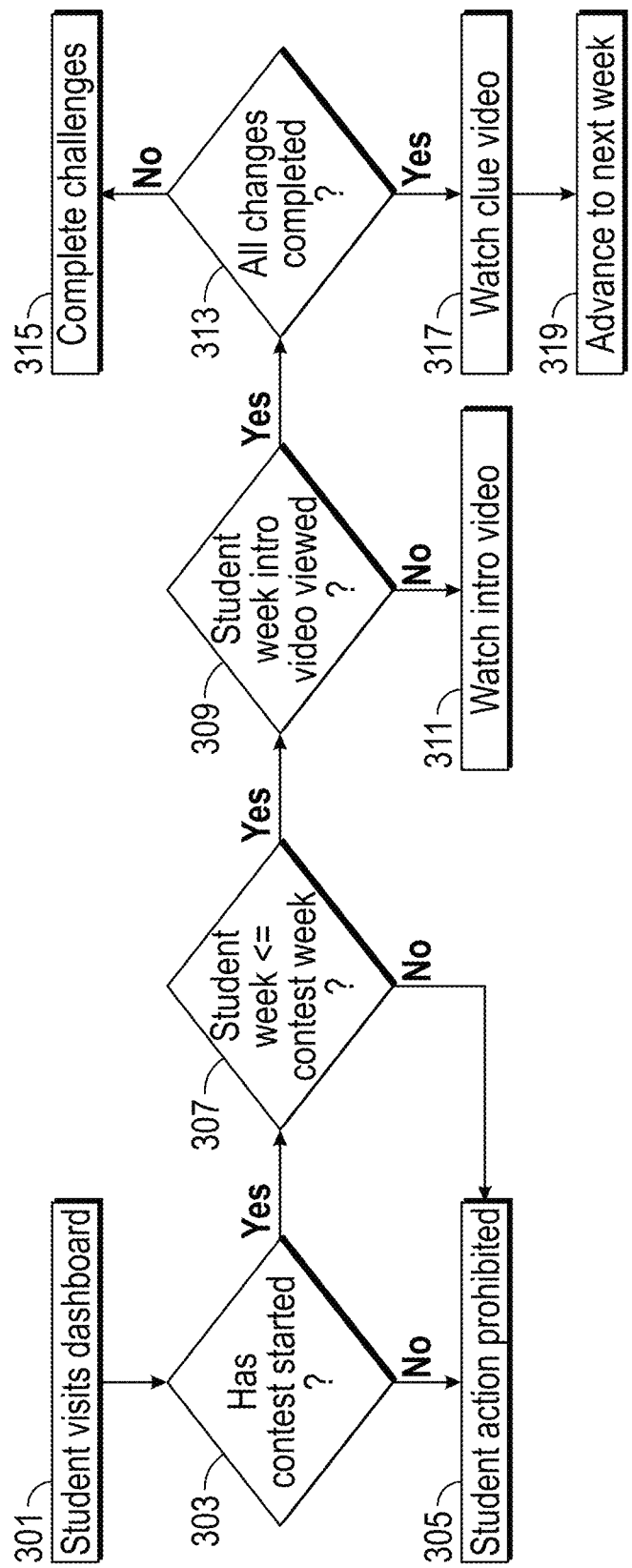
FIG. 3 illustrates a framework for prohibiting unauthorized user activity during a time-controlled progression.

Referring now to FIG. 3, an embodiment of the framework allowing for prohibiting unauthorized student activity during the progression of the academic challenge is shown. In step 301, the user visits a student dashboard or homepage for the academic challenge. In some embodiments, this may be the instruction page. In step 303, the system checks to see if the academic challenge or contest has actually started. If the contest has not started yet, then the system ends at step 305 where further user action is prohibited. The user may be directed to a page informing of the contest's start data and asked to check back when the contest has started. If in step 303, the contest has already begun, the system will then proceed to step 307 and check to see if the user's assignment week is less than or equal to the current contest week. For example, the contest may already be on the second week but the user may have not finished the first week of assignments. If this is the case, the system ends up back at step 305, which prohibits further user action. This is to prevent the user from continuing in the contest if they fall behind in their studies and is meant to motivate the user in keeping up with the weekly assignments. Notice that step 305 may also prohibit further action if in step 307 the user's current week is equivalent to the contest week, which means that the user has performed all of the challenges within that week. This may change as the contest progresses into the next week and unlocks new challenge content for the user. If however, the user has been keeping up with the assignments and step 307 is satisfied, then the system will proceed into step 309. Additionally, step 307 accounts for whether a student has enrolled late, as in such a scenario the student's week would be less than or equal to the contest week. However, another way to distinguish late-enrolled students is to directly compare their enrollment date against the start date of the contest and provide them with time equivalent to the difference in their enrollment date and the contest start date to catch up in the curriculum. At step 309, the system will check to see if the student has viewed that week's intro video. For example, with every week of assignments there may be an intro video for the student to watch. The video may be animated, and it may help further immerse the user into the academic challenge. If the user has not already watched that week's intro video (such as if the week has just started), then the system will detect that and proceed to step 311 for the user to watch the intro video. Otherwise, if the user has already seen the video then the system will proceed to step 313, which assesses whether all challenges or assignments for the week have been completed.

In many cases, the challenges will not have yet been completed for the week and the system will direct the user to step 315 to complete all the challenges. In some embodiments, this will consist of the user clicking links to external challenges as discussed regarding the Link to External Challenges 105 process in FIG. 1. From there, they may be directed to Reading Curriculum 105*a*, Writing Curriculum 105*b*, Math Curriculum 105*c*, and a Bonus Challenge 105*d*. If however, the user has completed all challenges for the week then the system will detect that and direct the user to step 317, rather than step 315, in order to watch a clue video. The clue video may present clues that are helpful in assisting the user in winning the overall academic challenge. For example, the clue video may present clues about the location of the buried treasure if the academic challenge involves a treasure hunt. After watching the clue video, the system will allow the user to proceed to step 319 and advance to the next week of the contest. In doing so, the student week will be adjusted upwards in order to prevent further student action the next time the student visits the dashboard, until the content for the next contest week is unlocked.

Parallel or Serial Access and Participation

Access to content can be controlled and metered out in multiple ways. For example, a user can only be allowed to interact with a website on a certain time-based schedule. A user may also be restricted based on content—access to some content is allowed initially but not later, later but not initially, etc. Access can be granted and controlled with respect to progress or access of other users. Accordingly, some users may be given access only when other users also have access, or access can be doled out exclusively to some but not others. Triggers and constraints can depend on input from participants.

One useful arena for controlled access and participation is academic challenges and/or other contests that motivate users to steadily and consistently perform constructive tasks while competing with each other for a prize. Frequently, these kinds of academic challenges or contests are run one at a time—in a serial fashion. For example, there may be a global contest that is available to all subscribers. However, the administrative framework may be designed to allow multiple contests to occur at the same time, or in parallel fashion. To accomplish this, the contests can be organized as Semesters, with specific start and end dates. Multiple Semesters can overlap, run concurrently, or run back to back. When users sign up for the academic challenge, they can be enrolled in the appropriate semester based on their payment options. Semesters can be made up of an unlimited amount of "Weeks". Start and end dates for each "Week" can be set by administrators. A "Week" can span any time period, from 7 days to 1 day to 1 hour. A Semester may have non-consecutive weeks by setting different start/end dates for successive "Weeks". For example, if a Semester was scheduled over a holiday and participation was expected to be minimal, the holiday dates could be skipped. This framework can also enhance a user's experience by allowing the user to be in multiple contests simultaneously. For example, a user may be enrolled in a contest with participants from their local school while also being enrolled in a contest with just a handful of close friends.

Interface Customization

Interfaces can be customized by users or by a system automatically to improve their efficiency and enjoyment. One trigger for such customization can be enrollment in a particular contest. Since there is the option of multiple contests, in some embodiments the framework also allows for the feature of customizing the student dashboard, home page, or instruction page, for different contests. To accomplish this, custom avatars can be chosen for each week, or by semester, allowing for different Semesters to have different artwork on the Student Dashboard. The Student Dashboard is generated automatically based on the number of Weeks. For example, if there are only five weeks there will only be five rows of challenges. Six weeks may result in six rows of challenges. When a challenge is added it is assigned to a Semester. At that time custom icons can be uploaded to reflect the different challenge states (e.g. available, in progress, complete, action required, etc.).

Interaction and Evaluation

Interaction through web-based systems can sometimes be enhanced when there is another living person accessible or involved at the other end. This can be especially true when subjective evaluation is involved. In a learning environment, some activities have objective right answers or can be programmed, and others depend on aesthetic or other factors that may be ill-suited for automation or programming. Evaluation of writing style is an example of an activity often well-suited for human evaluation. Nevertheless, human evaluation can be made efficient using a computer automated system, with efficiencies in delivery, ordering for review, fast response upon grading, comparative and/or quantitative analysis before or after subjective evaluation, etc.

The framework may include a teacher grading system for assessing the student's writing assignments. Students complete a writing assignment each week, and they may be required to write a certain number of words based on their age. A numeric count of words written as well as a progress bar shows how many words the student has remaining to write. They have the option to save an assignment and come back to it as well as submit it for approval when finished. As they are writing, the assignment auto saves every 30 seconds so that minimal work is lost in case the student goes to a different page or closes the browser without clicking the manual "Save" or "Submit" buttons.

Accordingly, In some embodiments, data on a writing assignment can be stored in a "Writing Assignment" data structure. The "Writing Assignment" structure stores info as to who graded an assignment, any comments about that assignment, and the grade for that assignment. The structure can store a history so that in the case of multiple graders, an assignment will track comments by each grader. Each assignment, by Semester/week/student, can be stored in its own structure. Thus, if an assignment has not been approved by a teacher, the student can see teacher comments about that assignment and internalize that feedback to produce better writing assignments in the future. After a student writing assignment has been submitted for grading, it is placed in a queue visible to all teachers when logged in. The queue shows all assignments needing to be graded, oldest first. From a Teacher Dashboard, the teacher can request a new grading assignment. When grading an assignment, the teacher can view previous assignments for that student, previous comments by teachers, any special information about that student (such as learning disabilities or other items that parents deem relevant), and biographical information such as name, age, sex, etc. The teacher grades the assignment on an Accepted/Not Accepted basis. The teacher can provide comments about the assignment. The assignment can be added to the Supervisor queue for final approval before the student is notified. The Supervisor can be notified via email that items need approval, and the Supervisor then reviews the assignment and sends it on to the student.

Figure 4:
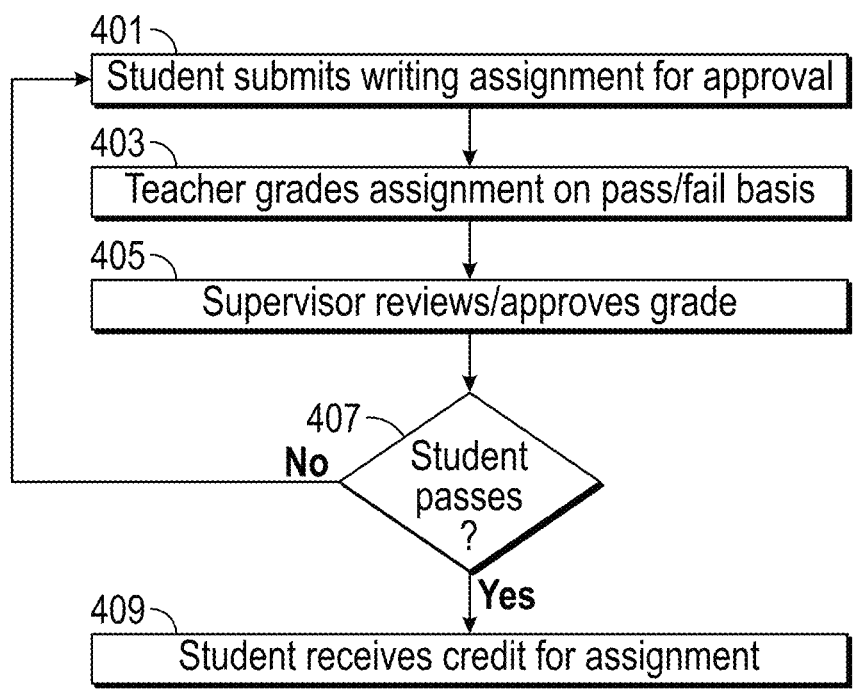
FIG. 4 illustrates a framework for a user submitting content for approval by a reviewer.

Referring now to FIG. 4, an embodiment is shown of a framework that allows for a user to submit a writing assignment for approval by a teacher and supervisor. Writing curricula and challenges provide an additional layer of complexity over math or reading challenges. It is easier to create a computerized-process or algorithm for assessing a user's performance in math or reading challenges. For example, it is relatively simple and straightforward to consider a math assignment completed if a given percentage of the math problems were solved with the correct answer. However, with writing challenges there will likely need to be a need for at least one human being to grade the writing submissions. This will make sure that the user's writing submission meets a certain quality and prevents the user from bypassing the writing challenge by simply submitting garbled, nonsensical text or plagiarized text that meets the word count. At step 401, a student submits a writing assignment for approval. The writing assignment is automatically produced at step 403, where a teacher will grade the assignment on a pass/fail basis and in accordance with a predefined rubric. After assigning a grade to the assignment, in step 405 a supervisor will review the grading and either approve or disapprove the grade. At step 407, the system will then determine whether the student passes. If the student did not pass, then the student will be directed back to step 401 to face another writing challenge and submit a new writing assignment for approval. If the student passed, then at step 409 the student will receive credit for the assignment. This may be reflected in the user's info, such that the user may see that they have received credit for this assignment when the user is checking their weekly progress.

Incentives, Challenges, and Contests

The framework may allow for a treasure hunt feature that is integrated with the academic challenge. In such an embodiment, the first student to guess within two miles of the latitude/longitude of the buried treasure is the winner. Students are allowed to guess once every twenty-four hours as to the location of the treasure. Guesses are stored in a "Hunt" structure that records the time of guess, the student name and the latitude/longitude. A map displays all previous guesses by that student. Clicking on the map places a temporary pin on the map and sets the coordinates for the guess. Clicking again will change move the pin and change the coordinates. A guess is finalized when "Submit" is pressed. In some embodiments, there is a technical lock-out in place where the "Submit" button and input field are hidden if twenty-four hours has not passed since the time of the student's last guess, based on the current server time and the timestamp of the student's most recent guess.

The systems and techniques for back-end content integration and user administration may work in conjunction with an educational, academic challenge such as the one disclosed in U.S. Patent Application No. 61/940,088 for a "Incentivized Online Education Assignment Game System", which is incorporated by reference herein in its entirety and described below:

A student (or parent) may register for a username and password on www.brainchase.com and begin weekly assignments. Writing assignments are administered internally at <www.brainchase.com>. A minimum word requirement may be given to respond to a short writing prompt. The student may submit their completed writing assignment each week online at www.brainchase.com where internal graders may award the student a pass or fail grade for that writing assignment. Reading and math assignments may be administered externally by Brain Chase, such as by content providers MyON and Khan Academy. These sites may provide the assignments, accept assignment input responses, and grade the assignments electronically and/or automatically. The assignments may include bonus challenge assignments, as described above. Students may not be required to register online separately for these Partners. The student's Brain Chase username and password may be automatically linked to these Partners' websites, <www.MyON.com> and <www.khanacademy.com>. Partners may submit to Brain Chase in real time the progress of each student.

A student (including high school/college/middle school and/or elementary school students) may use a computer and the Internet to register a new username and password on www.brainchase.com to gain access to and complete summer challenge assignments, or bonus challenge assignments.

Each week, the student may gain access using a computer and the Internet to the required weekly assignments at <www.brainchase.com>. In some embodiments, the student may be required to complete the assignment before the end of the week. In some embodiments, each assignment (or bonus challenge assignment) may have a goal that is measured in a metric, such as: minutes, hours, days, or weeks spent on the assignment (or bonus challenge assignment); or by achieving a number of assignments complete; or by accumulating a certain number of partner metric points (e.g. Khan "energy points"); or by submitting a writing assignment with the minimum number of words that was approved by a grader, etc. The student must complete these assignments and reach the goals before gaining access to an animated clue (also at <www.brainchase.com>). In some embodiments, the student may be required to complete the assignment before the end of the goal period (e.g., by the end of the week) to gain access to the animated clue.

The animated clues may be a series of exclusive original animated episodes, with hidden pictures, words, riddles, etc. These clues may be unlocked only after certain education metrics are met. For example, in some embodiments, the exact education metrics required to unlock a clue or set of clues, may be configured via desktop, mobile app, or web-based user interface. This configuration may be stored in an electronic database (in some embodiments, the same electronic database that may store student registration/configuration/profile information) that may be looked up when determining whether a student or other user has met the required metrics to unlock a clue or the next clue in a series of clues. Each clue reveals further the location of a hidden treasure worth a large sum of money. The treasure may be buried in an undisclosed location on Earth. At the end of the summer challenge, the treasure's location may be revealed in a final clue.

In some embodiments, the system may unlock other functions/features besides clues. For example, the system may unlock a child's ability to open certain content, such as videos, iPad Apps, video games, etc. based on completion of assignments. In some embodiments, a child may be unable to operate or play on their computer or tablet (such as an iPad), until completion of the assignments. After which, the system may unlock the restricted functionality by communicating a signal to the device to unlock (e.g. to unlock until next week when assignments are due again).

Once the student has achieved the weekly (or other time period) goal, he/she may be able to access the animated clue at <www.brainchase.com> that may further reveal the location of the hidden treasure. Brain Chase's Summer Challenge may continue for multiple weeks (e.g., 4, 5, 6 weeks, etc.), or other time period configurable through software. For example, depending on a school's summer vacation period, the time to play the game may be extended or reduced. In some embodiments, the weekly assignments may be sent out or posted each week (or other time period), but a student may complete any of the past weeks assignments as well (so as to catch up). In some embodiments, the clues may become more specific as the weeks advance (e.g, contain more information about the buried treasure than clues in earlier weeks). The challenge may be over the summer, and may take place over any season or length of time, such as the spring, fall, winter, a month, week, year, fortnight, etc.

In some embodiments, the treasure may be a secret website that may be accessed or guessed based on collection and analysis of the animated clues. In some embodiments, the treasure may be a real, physical, treasure located on earth (e.g. the clues may lead to GPS coordinates that has money buried within the ground). Such a treasure may include cash, or a one-of-a-kind mechanical, gold-plated globe, or anything that is of considerable or perceived value as a prize to a contest.

In some embodiments, users/students may go online and guess the location of the buried treasure using a Google maps interface. This may not require coordinates. Instead, in some embodiments, the user/student may drop a pin on the map interface to make their guess. The system may read the pinned map positions and award students with sufficiently good guesses (e.g., within a set distance of the treasure), or may award the closest student.

In some embodiments, the treasure may not be physically buried. Instead, the treasure may only represent a map position where treasure could be buried, and the object of the game can be to provide a best guess of the map position.

In some embodiments, reading and math assignments may be administered by third parties, such as MyON (<www.myon.com>) and Khan Academy (<www.khanacademy.com>), also known as content providers or vendors.

In a further embodiment, writing assignments are administered internally by Brain Chase.

In some embodiments, a bonus challenge assignment may be given/administered to students for completion, either by Brain Chase or a content provider. A bonus challenge may include a different challenge assignment each week related to a different subject, such as geographic, science, math, art, etc.

In some embodiments, students may be required to complete weekly assignments or goals, measured by minutes, hours, or any unit of time (and/or measured by other metrics such as such as # of math problems completed, etc., or by tracking content provider or vendor currency/metrics such as by using using Khan "energy points" which may act as a proxy for effort on a partner site), for math, reading and writing in order to gain weekly access online to animated clues exposing the location of the hidden treasure worth $10,000, or other configurable threshold, such as ($1,000, 2,000, $5,000, $10,000, $20,000, $50,000, $100,000, $150,000, $200,000, $500,000, or $1,000,000 or more).

The online educational system can comprise an electronic database comprising a plurality of student entries, each student entry comprising logon and use-metric information; and a hardware processor, the hardware processor configured to execute software instructions, the software instructions causing the hardware processor to: receive registration information from a user computer regarding a first student; access, over a network, a partner API to register the first student with a partner website or to link the first student with a student account associated with the partner website; receive the student account, the student account associated with the first student; store in the electronic database a first student entry of the plurality of student entries, the first student entry comprising the registration information and the student account; direct the first student, over the network, to assignments to be completed by the first student on the partner website; receive, over the network, first student metrics associated with completed assignments by the first student; store in the electronic database, as a part of the first student entry, the first student metrics; determine, based on the first student metrics, whether the first student has sufficiently completed assignments for a first clue, wherein the first clue comprises a series of animations; in response to determining that the first student has sufficiently completed assignments for a first clue, transmit clue display data, to a user device associated with the first student, configured to display the first clue; determine, based on the first student metrics, whether the first student has sufficiently completed assignments for a final clue; and in response to determining that the first student has sufficiently completed assignments for a final clue, transmit final clue display data, to the user device associated with the first student, configured to display the final clue, wherein the final clue may contain information leading to a treasure buried within the earth.

In some embodiments, the online educational system is completely customizable to fit the needs of various specific users (which can be organizations or programs). For example, the curriculum can be designed to fit the needs of a particular after-school program. The program or organization may be able to choose from a variety of options, such as, but not limited to, curriculum structure, duration, number of challenges, prizes, layout, theme, etc. An interface, such as a graphical user interface, can provide these programs or organizations a convenient way to formulate a curriculum map. This may involve the users or organizations being able to click and drag icons into different arrangements, to emphasize or de-emphasize various aspects of the interface.

Figure 5:
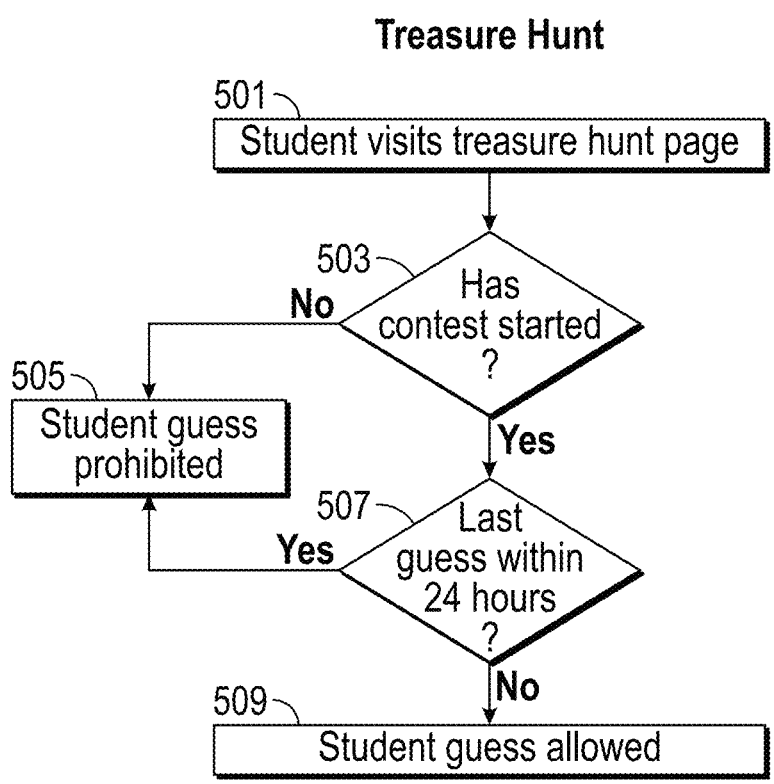
FIG. 5 illustrates a framework restricting the user in submitting guesses for a contest.

Referring now to FIG. 5, an embodiment of a framework is shown that allows for restricting the user in submitting guesses for the location of a treasure when the academic challenge involves a treasure hunt. At step 501, the student visits a treasure hunt page. This treasure hunt page may be separate from the previously mentioned student dashboard, homepage, or instruction page. After visiting the treasure hunt page, the system proceeds to step 503 to check whether the contest has already started. If the contest has not yet started, then the system proceeds to step 505 and prohibits the student from making any guesses about the location of the buried treasure. If the contest has started, the system proceeds to step 507 to check if the user has already submitted a guess for the location of the buried treasure in the last twenty-four hours. If yes, then the system ends up at step 505 to prohibit the student from guessing. Note that the interval selected allows the student to submit one guess every twenty-four hours. However, the check at step 507 can be configured to allow any number of guess in any predefined time interval. For example, if it may be particularly easy to guess the location of the buried treasure in the academic challenge then the number of guesses permitted in a time interval may be adjusted to account for that ease. As another example, step 507 may be configured to allow a user to make one guess every two days. In FIG. 5, if the student has not submitted a guess within twenty-four hours then the system progresses to step 509 to allow the student to submit a guess for the buried treasure.

Added security and secrecy regarding the location of the treasure can be provided by not actually storing the treasure location in a database. In such scenarios, there may not be a computerized process after step 509 that checks the student's guess against a stored treasure location. Instead, all the guesses from all the users may be time stamped and saved in a database. An administrator can then search the database through all the students' guesses in order to find the guesses that are closest to the actual treasure location. The administrator can also look at the timestamps affixed to the students' guesses and determine which student's guess discovered the actual treasure location first.

Figure 6:
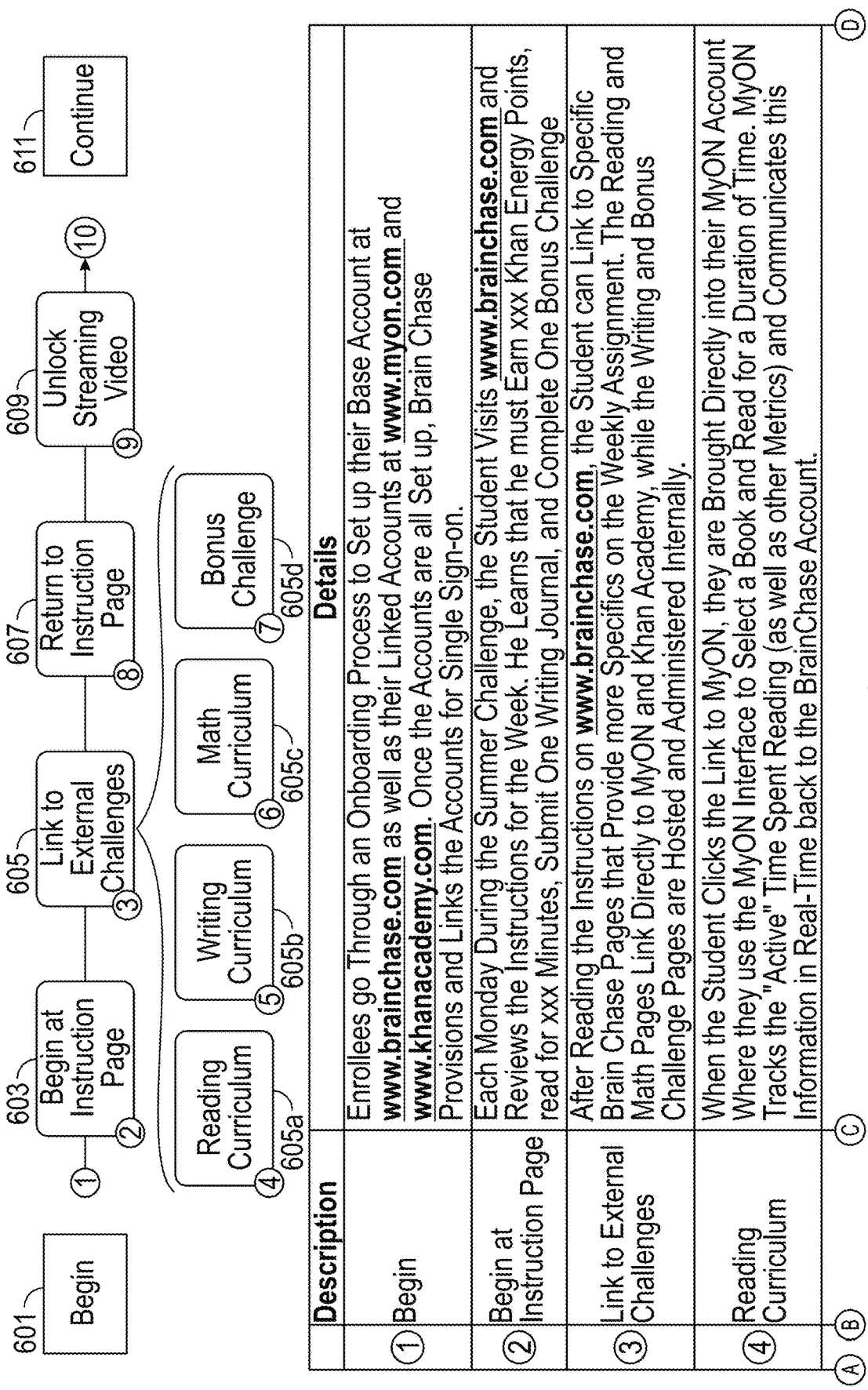
FIG. 6 illustrates a user experience in a basic computer-based academic contest utilizing improved content integration.

Referring now to FIG. 6, a user experience in a basic computer-based academic challenge that utilizes improved (e.g., seamless) content integration is shown. In FIG. 6, the Begin 601 process handles the enrollment and log-in of users in the system. If a user does not have an account already, the Begin 601 process will obtain information from the user and enroll the user in a base account that allows the user access to the system, which in some embodiments may be used to administer or comprise an educational challenge. The Begin 601 process will then perform one-step registration by using the information obtained from the user to create and set up linked accounts with various content providers or vendors. These linked accounts may be linked to the base account in order to provide for single sign-on, so that the user only needs to access their base account in order to simultaneously obtain access to the linked accounts and the content provided at the various content providers or vendors. If the user already has an account, then the user can log-in via the Begin 601 process and access their base account, which may also provide simultaneous access to any of the linked accounts that are linked to the base account. In some embodiments, the user will use the Begin 601 process in order to access their base account at a URL, such as <www.brainchase.com>. In some embodiments, accessing the base account may provide direct access to the linked accounts or allow the user to access or view content from the content providers or vendors. In some embodiments, the linked accounts will be associated with providers or vendors of educational content, such as <www.myon.com> and <www.khanacademy.com>.

Again, linking the user's linked accounts to their base account can be very helpful in allowing the system to provide single sign-on for the user. Once the user logs into their base account, they will gain access to all the linked accounts of the various content provides or vendors and, thus, all the content, assignments, and curricula involved in the academic challenge. This allows the provider of the academic challenge to more smoothly (e.g., seamlessly) integrate the content from various content providers or vendors. When the user is playing through the academic challenge, the user will not need to proceed through another log-in or enrollment process. The user will not need to log into a content provider's site in order to access assignments or curriculum, which means there are no breaks in continuity of the user's immersion in the academic challenge. In short, the user can be solely focused on the academic challenge and completing the relevant assignments without being detracted by various log-in or enrollment processes.

The Begin at Instruction Page 603 process then directs the user to an instruction page. In some embodiments, the instruction page may provide links to assignments or curricula that the user may need to complete. In some embodiments, the instruction page may require the assignments or curricula to be completed in a certain sequence or within a certain set schedule in order for links to further additional assignments or curricula to be unlocked and accessible to the user. For example, in order for the user to progress in the educational challenge the user may be forced to proceed through the links in a specific order that the system will prevent the user from deviating from. In some embodiments, the instruction page may provide the user instructions or goals for the week. For example, the user may be informed that, for the week, the user needs to earn 500 Khan "energy points", read for 30 minutes, submit one writing journal, and complete one bonus assignment.

Once users click on instruction page links, the Link to External Challenges 605 process directs users to a specific page that provides more specific information associated with the assignment or curriculum. In some embodiments, the Link to External Challenges 605 process directs a user to specific Brain Chase pages that provide specifics on a particular weekly assignment. In some embodiments, the user may be directed to pages hosted by, or directly associated with, a content provider or vendor. For example, clicking a link associated with a Reading Curriculum 605a or Math Curriculum 605c may direct the user to pages of education content providers MyON and KhanAcademy. In some embodiments, the user may be directed to pages hosted and administered internally by the provider of the computer-based academic challenge. For example, clicking a link associated with a Writing Curriculum 605b or Bonus Challenge 605d may direct the user to pages provided by Brain Chase. The benefit provided by having the Link to External Challenges 605 process direct users to various content providers or vendors based on subject selected is that the best-in-class content provider for a given subject, assignment, or curriculum can be utilized.

The various curriculums and challenges 605a, 605b, 605c, and 605d will now be explained in more detail. In some embodiments, clicking a link associated with a Reading Curriculum 605a may bring the user directly into their MyON linked account that is linked to their base account. The user may then use the MyON-provided interface to select a book and then read for a duration of time. MyON may track this active time spent reading, along with any other relevant metrics, and communicate this information in real-time back to the Brain Chase base account. In some embodiments, the content provided by MyON may actually be directly integrated and displayed on a page provided by Brain Chase, or other provider of a computer-based academic challenge. In some embodiments, Brain Chase itself may be providing the reading content.

In some embodiments, clicking a link associated with a Writing Curriculum 605b may bring the user directly into the user's linked account of a writing content provider that is linked to the user's base account. In some embodiments, Brain Chase itself may be providing the writing content. For example, the writing assignment may be internally delivered. The user will be sent to a Brain Chase page with an open-ended writing prompt and will begin a text field on the page. Each user may have a minimum word count requirement based on the user's age, which may have been collected during the user's enrollment during the Begin 601 process. Once the user exceeds the word limit, the user can submit the work for review from Brain Chase's internal teaching staff and will subsequently receive pass/fail feedback.

In some embodiments, clicking a link associated with a Math Curriculum 605c may bring the user directly into their Khan Academy linked account that is linked to their base account. As the user completes different math problems and watches different videos, the user will earn "energy points" on Khan Academy. Brain Chase, or another provider of the academic challenge, may track these energy points in real time via the Khan Academy open API. In some embodiments, the content provided by Khan Academy may actually be directly integrated and displayed on a page provided by Brain Chase, or other provider of a computer-based academic challenge. In some embodiments, Brain Chase itself may be providing the math content.

In some embodiments, clicking a link associated with a Bonus Challenge 605d may direct the user to either online or offline content that presents a "bonus challenge" for the user. For example, the user may have a "bonus challenge" each week that is notably distinct from the assignments and curricula associated with 605a, 605b, and 605c. For example, the user may receive a compass in the mail and be required to do some orienteering. As another example, the user may be directed to the Smithsonian Museum's Virtual Tour to find or locate a virtual object. In some embodiments, Bonus Challenge 605d will provide the user instructions and a text field for the user to input an answer into. This submitted answer may be binary in nature, such that user is either right or wrong.

Further in reference to FIG. 6, after a user has clicked a link and utilized the Link to External Challenges 605 process to review pages containing assignments or curricula associated with 605a, 605b, 605c, and 605d, the user may use the Return to Instruction page 607 process in order to return to the instruction page at any point. The user will then be presented with an updated-instruction page so that the user can see where they stand in achieving the week's assignments. For example, the user may see that they have completed 36 of 45 reading minutes, completed enough math problems to earn 3500 of the 5000 required Khan "energy points", or completed their writing sample. It can be helpful if this instruction page is kept up-to-date so that the user can continually keep track of their process and obtain immediate positive feedback from completing assignments. Keeping the instruction page up-to-date is performed by taking data snapshots from user info requested from each vendor, which is enabled by successful authentication with the vendor.

When all of the requirements have been met, the Unlock Streaming Video 609 process unlocks a streaming video, or a link to streaming video, on a page of the academic challenge provider. In some embodiments, the Unlock Streaming Video 609 process unlocks a streaming video on <www.brainchase.com> for the user to view once all the assignments or challenges for the week have been successfully completed.

Upon viewing the unlocked streaming video, the user may have to repeat the entire system of processes at another time, such as on the following week. The Continue 611 process may present the user with a clock countdown that indicates when following assignments will be given, and that clock countdown may be displayed on the instruction page to be prominently featured in future log-ins. In some embodiments, the user may have to repeat this entire system of processes for six weeks until all assignments have been completed and the user has viewed all of the animated content or videos associated with the academic challenge.

There is no limit to the number of assignments, challenges, or weeks that a contest may have. The logic that assesses whether a challenge has been completed may not consider how many challenges there are in a week, or how many challenges there are in total. In some embodiments, the number of challenges may vary week by week. It may be helpful to consider how different numbers of challenges may impact the visual display on the dashboard, such as how the challenges may fit and be displayed on the dashboard. The visual display on the dashboard may be configured to display eight or fewer challenges per week. However, the visual display on the dashboard may alternatively or additionally be configured to accommodate any number of challenges. In some embodiments, the visual display on the dashboard may accommodate an infinite number of challenges. Similarly, the visual display on the dashboard may accommodate any number of weeks. This may be accomplished by adding or removing weeks, along with their corresponding videos and challenges, to the visual display. The dashboard may be configured to display a six week contest, along with the video content and challenges that the student is expected to go through during those six weeks.

Screenshots of Actual Portal and Web Views

Figure 7:
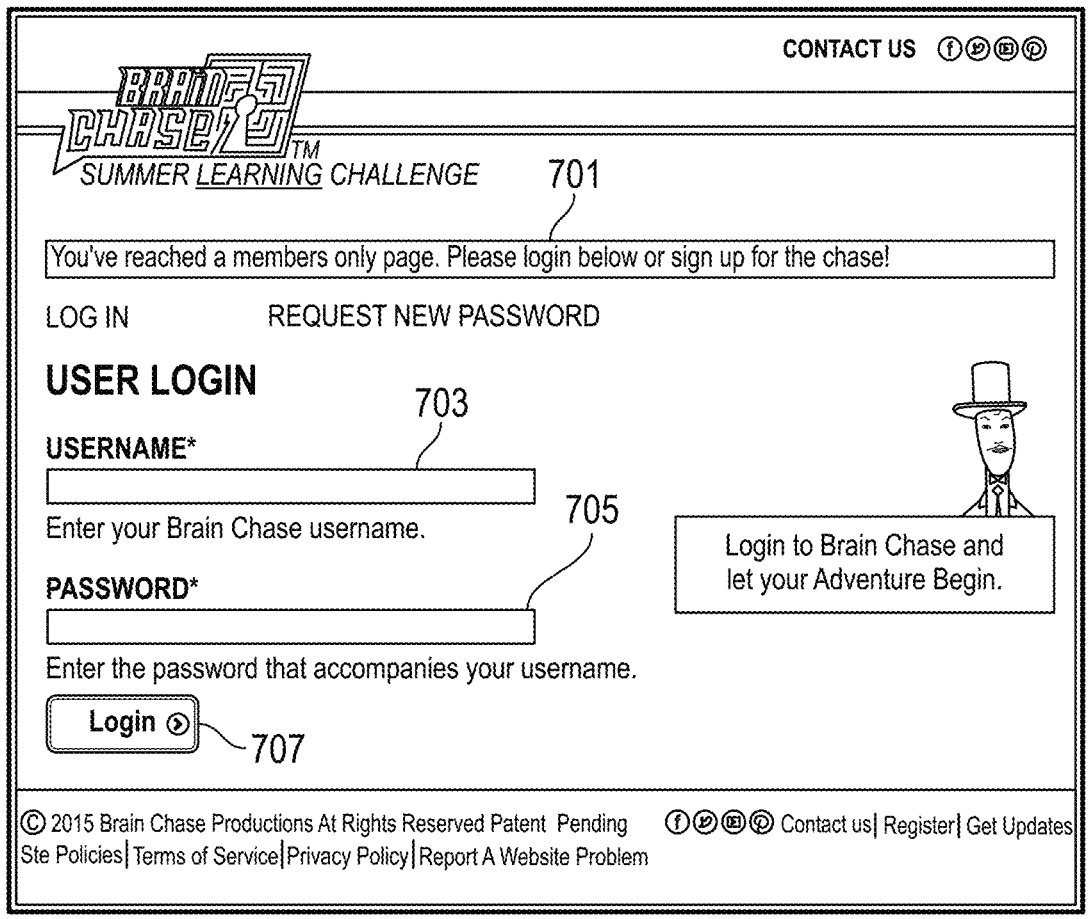
FIG. 7 is a screenshot of a portal page in an example use scenario.

Referring now to FIG. 7, a screenshot of a portal page in an example use scenario is shown involving the account creation, linking, and log-in processes discussed above with respect to FIG. 1A. Here, the method for determining whether the user is new, or has a pre-existing base account, is through presenting the user with input fields to enter relevant base account information such as username/user ID and password, while also presenting a separate link or button allowing new users to enroll or register. If the user is a new user, they can click Sign Up Link 701, which is a hyperlink that directs the user to a registration process. That process can collect relevant information from the user needed to create a base account, such as birthdate or age, grade, username or user ID, password, email, information associated with a parent of the user, etc. This registration process may also create linked accounts for the user. They user may not be aware that these linked accounts are being created, or the registration process may inform the user that linked accounts for the user have been, or will be, created. Once registered, the user may be directed through to the dashboard area of the contest, or be directed back to the portal page to enter their credentials like a user with a pre-existing base account may be required to.

On the portal page, if the user has a pre-existing base account then the user may enter their username or user ID in the Username Field 703, along with their password in Password Field 705. After entering in these credentials, the user may then click on Log-In Button 707 in order to begin a log-in process. Log-In Button 707 may be greyed out or inactive before the user has made inputs to both the Username Field 703 and Password Field 705, and only become clickable once the user has made those inputs. Afterwards, the log-in process will verify the credentials that the user has inputted against the base account credentials in the data structure that stores all the base account information alongside their associated linked account information. If the log-in is successful, then the log-in process may also log the user into any associated linked accounts using the information stored in the data structure. A portal page with this kind of layout and functionality may be useful because it is not only aesthetically simplistic, but also it may be the only log-in screen that a user may be required to go through in order to finish the contest. Such an approach can provide for efficient access because the user may only need to enter credentials once in order to log into any associated linked accounts, and afterwards the user would have access to any content requiring the use of the linked accounts.

Figure 8:
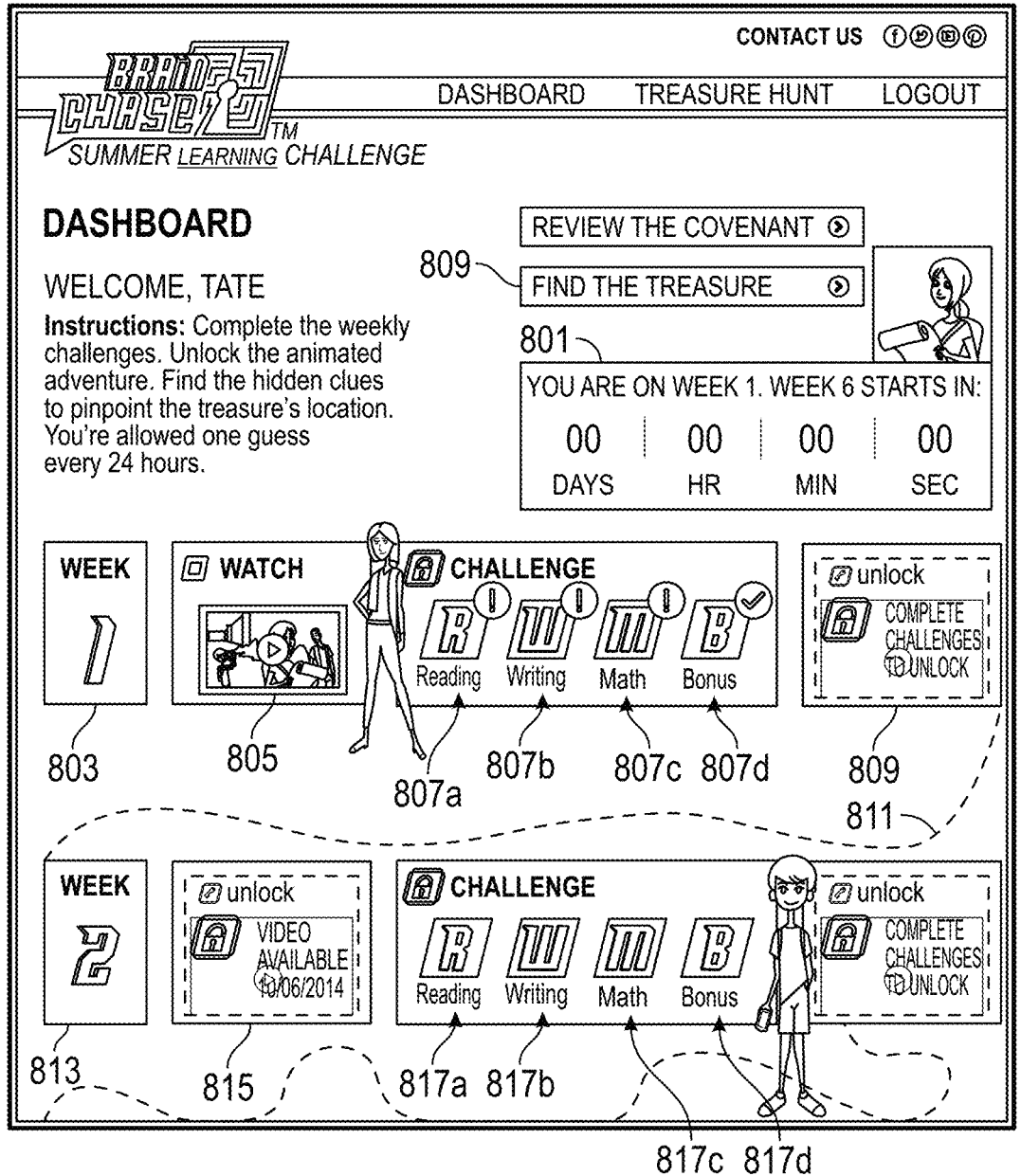
FIG. 8 is a screenshot of a dashboard page in an example use scenario.

Referring now to FIG. 8, a screenshot of a dashboard page in an example use scenario is shown involving the back-end integration of third-party content providers. In one embodiment, this dashboard page is the page that users are directed to upon a successful log-in. Time Display 801 shows the current week of the contest that the user is on, as well as the time until the next week starts. The numbers shown on Time Display 801 in this diagram are for example purposes only. Time Display 801 on the dashboard may typically be helpful in notifying the user how much time they have left in finishing the challenges for the week in order to stay in the contest. Time Display 801 may also be helpful in notifying a user, who has already completed the week's challenges, about how much time the user needs to wait until the next set of weekly challenges is unlocked.

Week Display 803 informs the user that the videos and weekly challenges that are horizontally aligned with Week Display 803 are associated with the first week of the contest. Similarly, Week Display 813, which says "Week 2", informs the user that those videos and challenges horizontally aligned with Week Display 813 are part of the second week of the contest.

For the first week, the user has to first watch Introductory Video 805. Here, the first week has been unlocked so Introductory Video 805 can be watched by the user whenever the user desires. Introductory Video 805 serves to progress the animated storyline and is meant to further immerse the user into the contest. In contrast, Introductory Video 815 is associated with the second week of challenges. In this screenshot, the second week has not been unlocked yet so Introductory Video 815 is grayed-out and cannot be accessed until made available.

For the first week, four challenges are displayed for the user: Reading Challenge 807a, Writing Challenge 807b, Math Challenge 807c, and Bonus Challenge 807d. The graphics for these challenges are slightly different than the graphics for the second week's challenges, shown in 817a, 817b, 817c, 817d. For example, the exclamation sign in the upper right corner of the Reading Challenge 807a graphic informs the user that the Reading Challenge for week one is available and has not yet been completed. The check mark in the upper right corner of the Bonus Challenge 807d graphic notifies the user that the bonus challenge has been successfully completed for the week. The 817a, 817b, 817c, and 817d graphics do not have exclamation mark or check mark insets, which further informs the user that the second week has not yet been unlocked. Clicking on challenge graphics 807a, 807b, 807c, and 807d brings the user directly to a page that displays the content for the challenge associated with the challenge graphic. For example, upon clicking the Reading Challenge 807*a* graphic the user may be directed to a page with the reading challenge for week one. However, in some embodiments clicking on the challenge graphics may not direct the user to an entirely separate page, but can instead open a pop-up window containing the content for the associated challenge.

Clue Video 809 is the video associated with week one of the contest. However, in this screenshot it is still locked because the user has not yet completed the first week's reading, writing, and math challenges. Once the user has completed those challenges, Clue Video 809 will unlock and be viewable to the user, similar to how Introductory Video 805 is current available to the user for viewing. At any time, the user may click the Find the Treasure 819 link to be brought to a treasure hunt page to make a guess as to where the location of the buried treasure is. However, prior to guessing it may be helpful for the user to have viewed all of the clue videos in order to better pinpoint the location of the buried treasure.

The layout presented here may be helpful because it allows the user efficient access to all of the challenge content. Since the user is already logged onto any linked accounts using the single sign-on method discussed above with reference to FIG. 1A, the user does not need to do anymore logging-in to access any challenges. The user can simply click on each challenge graphic and start completing that challenge. The challenge graphics 807*a*, 807*b*, 807*c*, and 807*d* also efficiently communicate what kind of challenge the user will be directed to. The challenge graphics are also right next to each other, so that the user can easily find and complete each challenge in succession. This layout may further be helpful in quickly informing the user which challenges are associated with the current week of the contest, as well as which challenges or videos have been completed or viewed. A quick glance at this dashboard page will inform the user that the first week's reading, writing, and math challenges are unlocked but uncompleted, whereas the first week's bonus challenge has been unlocked but completed by the user. Finally, Contest Trail 811 is used to graphically connect the ending of the contest's first week to the beginning of the contest's second week. This can provide a user, who may be a young student, with a better idea of how the weeks of the contest fit together, the overall progression of the contest, and where the user's current progression is in the contest. Thus, this layout may be helpful in matching a user's natural inclination to read texts and graphics from left-to-right before reading top-to-bottom.

Figure 9:
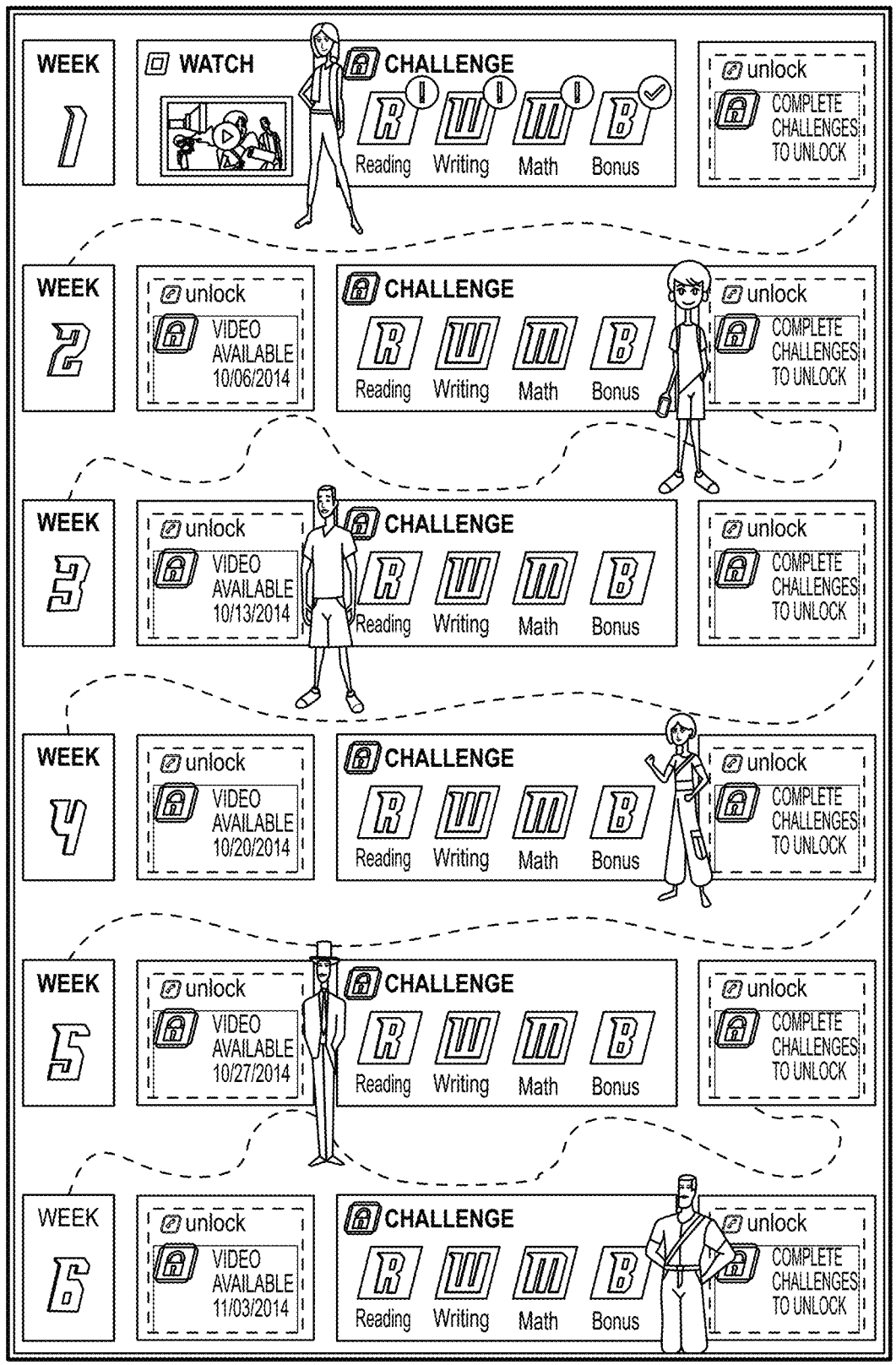
FIG. 9 is another screenshot of a dashboard page in an example use scenario.
Figure 10:
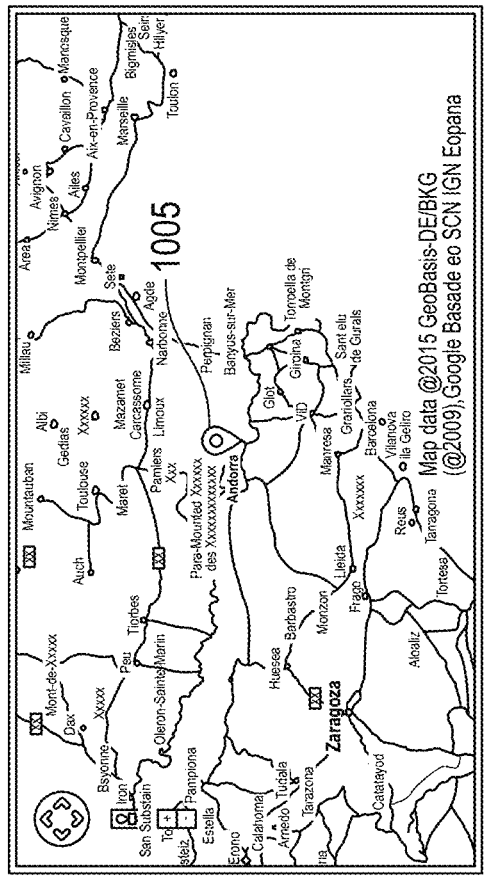
FIG. 10 is a screenshot of a treasure hunt page in an example use scenario.

Referring now to FIG. 9, another screenshot is provided of the dashboard page in an example use scenario is shown. FIG. 9 shows what the dashboard looks like if the user scrolls downward. As can be seen, the videos and challenges for each week of the contest are shown in a simple and consistent manner, allowing for easy readability. The sixth week is presented at the very bottom, which makes it easy to understand that the sixth week is the last week of the contest. Referring now to FIG. 10, a screenshot of a treasure hunt page in an example use scenario is shown involving the framework for restricting user submission of guesses for the location of a treasure, as discussed above with respect to FIG. 5. This treasure hunt page contains a Guess Timer 1001, which is there to inform the user when they can make their next guess as to the location of the buried treasure. Here, the Guess Timer 1001 is zeroed, but if the Guess Timer 1001 has time on it, the user will not be able to make a guess until the displayed time has run down to zero. In this embodiment, the treasure hunt has been structured to only allow the user one guess every twenty-four hours. Guess Timer 1001 may indirectly track when the user last made a guess. There may be a technical lock-out in place, so that the user will be unable to make a guess at all until Guess Timer 1001 runs down to zero.

Location Map 1003 provides the user a visual display of the region in which the treasure may be buried. In some embodiments, Location Map 1003 is presented through the use of a third-party tool or API, such as Google Maps. Location Map 1003 may display, through the use of a pointer, previous locations that the user has incorrectly guessed. When the technical lock-out is not being applied, the user may be able to click somewhere on Location Map 1003 in order to make another guess about the treasure's location. The process of making the guess may involve the user submitting coordinates after clicking on Location Map 1003. Location Pointer 1005 shows a visual depiction of a location on Location Map 1003. Location Pointer 1005 may be used to point out a previous incorrect guess of the user, or it may be used to point out where exactly a user's guess location is before the user submits it. This may be beneficial in allowing the user to see where they are guessing, such that they do not submit a guess for the treasure location that involves the treasure being buried out in the middle of the ocean.

Figure 11:
FIG. 11 is a screenshot of third-party content in an example use scenario.

Referring now to FIG. 11, a screenshot of third-party content is shown. This screenshot may depict the view that a user may have see if they have clicked on a math challenge, such as if the user has clicked on the Math Challenge 807*c* graphic in FIG. 8. The content can be smoothly (e.g., seamlessly) integrated into the contest, so the user may be brought to a page such as the one shown in FIG. 11 without having to further log-in. FIG. 11 is only an example, and in some embodiments the user may be brought directly to a page that presents the user math problems, or a writing input field, etc. In the current figure, the user can see that this content is being provided by Khan Academy, as shown in the upper left hand corner of the site. The Grade Label 1101 informs the user that the account is currently set up at the 4th Grade level, so any math problems presented to the user will be at a 4th Grade level. Thus, a user can quickly see what difficulty level the content is set at and whether it is incorrect. A user who is a 6th grader may not want to be doing math problems that are meant to be solved by 4th graders. Here, if the grade level is correct then the user may click Start Button 1103 in order to start the math challenge.

ADDITIONAL EMBODIMENTS

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Many variations and modifications may be made to the above-described embodiments, the elements of which are among other acceptable examples. All such modifications and variations are intended to be included herein within the scope of this disclosure. The foregoing description details certain embodiments of the disclosure, some of which are inventive. It will be appreciated, however, that no matter how detailed the foregoing appears in text, the solutions of this disclosure may be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated. The scope of any inventions hereunder should therefore be construed in accordance with the appended claims and any equivalents thereof.

What is claimed is:

1. A system comprising:
   an electronic database comprising a plurality of student entries, each student entry comprising logon and usemetric information; and
   a hardware processor, the hardware processor configured to execute software instructions, the software instructions causing the hardware processor to:
   receive registration information from a user computer regarding a first student;
   register the first student to create a student account associated with a learning program;
   store in the electronic database a first student entry of the plurality of student entries, the first student entry comprising the registration information and the student account;
   receive a first request for the first student to access activities associated with a first time period of the learning program;
   receive a status data structure associated with the first student;
   determine, using the status data structure, that (i) the first student has completed one or more prerequisites for the activities associated with the first time period and that (ii) the first time period is before or matches a current time period;
   in response to determining that (i) the first student has completed one or more prerequisites for the activities associated with the first time period and that (ii) the first time period is before or matches the current time period, allow the first student access to the activities associated with the first time period;
   determine first student metrics associated with completed activities by the first student;
   store in the electronic database, as a part of the first student entry, the first student metrics;
   determine, based on the first student metrics, whether the first student has sufficiently completed activities to receive first content;
   in response to determining that the first student has sufficiently completed activities to receive the first content, transmit the first content, to a user device associated with the first student, configured to display the first content;
   receive, after the first request, a subsequent second request for the first student to access activities associated with a second time period of the learning program;
   determine that the second time period is after the current time period of the learning program; and
   in response to determining that the second time period is after the current time period associated with the learning program, deny the first student access to the activities associated with the second time period.

2. The system of claim 1, wherein determining, based on the first student metrics, whether the first student has sufficiently completed activities to receive the first content further comprises adjusting for difficulty using a normalizing internal metric.

3. The system of claim 1, wherein determining that the first time period is before or matches the current time period further comprises applying a timing constraint that compares a student's week or enrollment date to an official week or start date, thereby allowing late-enrolling students to catch up.

4. The system of claim 1, wherein the first student metrics comprise identifying information as to graders of the completed activities, feedback comments associated with the completed activities, and grades associated with the completed activities, wherein the grades indicate a level of satisfactory completion of the completed activities.

5. The system of claim 1, wherein the hardware processor is further configured to:
receive the completed activities associated with the first student;
sort the completed activities into a queue, wherein the queue comprises a plurality of completed activities without grade information;
receive requests for new activities, wherein the new activities comprise one of the completed activities in the queue; and
associate a first grader with the new activities.

6. The system of claim 5, wherein the hardware processor is further configured to display the queue on a grader dashboard, wherein the grader dashboard is a graphical user interface through which the first grader can view the queue.

7. The system of claim 1, wherein the completed activities comprise answers to problems, and wherein determining the first student metrics further comprises:
calculating point values from the answers to the problems; and
assigning the point values to the first student metrics.

8. A method comprising:
receiving registration information from a user computer regarding a first student;
registering the first student to create a student account associated with a content program;
storing in an electronic database a first student entry of a plurality of student entries, the first student entry comprising the registration information and the student account;
receiving a first request for the first student to access activities associated with a first time period of the content program;
receiving a status data structure associated with the first student;
determining, using the status data structure, that (i) the first student has completed one or more prerequisites for the activities associated with the first time period and that (ii) the first time period is before or matches a current time period;
in response to determining that (i) the first student has completed one or more prerequisites for the activities associated with the first time period and that (ii) the first time period is before or matches the current time period, allowing access to the activities associated with the first time period to the first student;
determining first student metrics associated with completed activities by the first student;
storing in the electronic database, as a part of the first student entry, the first student metrics;
determining, based on the first student metrics, whether the first student has sufficiently completed activities to receive first content;
in response to determining that the first student has sufficiently completed activities to receive the first content, transmitting the first content, to a user device associated with the first student, configured to display the first content;
receiving, after the first request, a subsequent second request for the first student to access activities associated with a second time period of the content program;
determining that the second time period is after the current time period of the content program; and
in response to determining that the second time period is after the current time period associated with the content program, denying the first student access to the activities associated with the second time period.

9. The method of claim 8, wherein determining, based on the first student metrics, whether the first student has sufficiently completed activities to receive the first content further comprises adjusting for difficulty using a normalizing internal metric.

10. The method of claim 8, wherein determining that the first time period is before or matches the current time period further comprises applying a timing constraint that compares a student's week or enrollment date to an official week or start date, thereby allowing late-enrolling students to catch up.

11. The method of claim 8, wherein the first student metrics comprise identifying information as to graders of the completed activities, feedback comments associated with the completed activities, and grades associated with the completed activities, wherein the grades indicate a level of satisfactory completion of the completed activities.

12. The method of claim 8, further comprising:
receiving the completed activities associated with the first student;
sorting the completed activities into a queue, wherein the queue comprises a plurality of completed activities without grade information;
receiving requests for new activities, wherein new activities comprise one of the completed activities in the queue; and
associating a first grader with the new activities.

13. The method of claim 12, further comprising: causing the queue to be displayed on a grader dashboard, wherein the grader dashboard is a graphical user interface through which the first grader can view the queue.

14. The method of claim 8, wherein the completed activities comprise answers to problems, and wherein determining the first student metrics further comprises:
calculating point values from the answers to the problems; and
assigning the point values to the first student metrics.

15. A non-transitory computer readable medium storing software instructions thereon, the software instructions when executed causing a computer system to:
receive registration information from a user computer regarding a first student;
register the first student to create a student account associated with a content program;
store in an electronic database a first student entry of a plurality of student entries, the first student entry comprising the registration information and the student account;

receive a first request for the first student to access activities associated with a first time period of the content program;

receive a status data structure associated with the first student;

determine, using the status data structure, that (i) the first student has completed one or more prerequisites for the activities associated with the first time period and that (ii) the first time period is before or matches a current time period;

in response to determining that (i) the first student has completed one or more prerequisites for the activities associated with the first time period and that (ii) the first time period is before or matches the current time period, allow access to the activities associated with the first time period to the first student;

determine first student metrics associated with completed activities by the first student;

store in the electronic database, as a part of the first student entry, the first student metrics;

determine, based on the first student metrics, whether the first student has sufficiently completed activities to receive first content, wherein the first content comprises at least one of audio data or visual data;

in response to determining that the first student has sufficiently completed activities to receive the first content, transmit the first content comprising the at least one of audio data or visual data, to a user device associated with the first student, configured to display the first content;

receive, after the first request, a subsequent second request for the first student to access activities associated with a second time period of the content program;

determine that the second time period is after the current time period of the content program; and in response to determining that the second time period is after the current time period associated with the content program, deny the first student access to the activities associated with the second time period.

16. The non-transitory computer readable medium of claim 15, wherein determining, based on the first student metrics, whether the first student has sufficiently completed activities to receive the first content further comprises adjusting for difficulty using a normalizing internal metric.

17. The non-transitory computer readable medium of claim 15, wherein determining that the first time period is before or matches the current time period further comprises applying a timing constraint that compares a student's week or enrollment date to an official week or start date, thereby allowing late-enrolling students to catch up.

18. The non-transitory computer readable medium of claim 15, wherein the first student metrics comprise identifying information as to graders of the completed activities, feedback comments associated with the completed activities, and grades associated with the completed activities, wherein the grades indicate a level of satisfactory completion of the completed activities.

19. The non-transitory computer readable medium of claim 15, wherein the software instructions when executed further causes a computer system to:

receive the completed activities associated with the first student;

sort the completed activities into a queue, wherein the queue comprises a plurality of completed activities without grade information;

receive requests for new activities, wherein the new activities comprise one of the completed activities in the queue; and associate a first grader with the new activities.

20. The non-transitory computer readable medium of claim 15, wherein the completed activities comprise answers to problems, and wherein determining the first student metrics further comprises:

calculating point values from the answers to the problems; and assigning the point values to the first student metrics.

* * * * *